United States Patent
Luo et al.

(10) Patent No.: US 12,058,745 B2
(45) Date of Patent: Aug. 6, 2024

(54) SYSTEM AND METHOD FOR RRC CONNECTION USING A RELAY TERMINAL

(71) Applicant: Huawei Technologies Co., Ltd., Shenzhen (CN)

(72) Inventors: Haiyan Luo, Shanghai (CN); Mingzeng Dai, Shenzhen (CN); Jun Wang, Shanghai (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 530 days.

(21) Appl. No.: 17/193,518

(22) Filed: Mar. 5, 2021

(65) Prior Publication Data

US 2021/0195666 A1 Jun. 24, 2021

Related U.S. Application Data

(63) Continuation of application No. PCT/CN2019/104596, filed on Sep. 5, 2019.

(30) Foreign Application Priority Data

Sep. 7, 2018 (CN) .............................. 201811044515

(51) Int. Cl.
*H04W 76/11* (2018.01)
*H04W 48/16* (2009.01)
(Continued)

(52) U.S. Cl.
CPC ............ *H04W 76/11* (2018.02); *H04W 48/16* (2013.01); *H04W 72/044* (2013.01); *H04W 80/02* (2013.01)

(58) Field of Classification Search
None
See application file for complete search history.

(56) References Cited

U.S. PATENT DOCUMENTS 10,129,890 B2 * 11/2018 Speight ............... H04W 52/245
11,064,557 B2   7/2021 Feng
(Continued)

FOREIGN PATENT DOCUMENTS

CN    106488569 A    3/2017
CN    106656418 A    5/2017
(Continued)

OTHER PUBLICATIONS

"3rd Generation Partnership Project; Technical Specification Group Radio Access Network; Study on further enhancements to LTE Device to Device (D2D), User Equipment (UE) to network relays for Internet of Things (IoT) and wearables; (Release 15)," 3GPP TR 36.746 V15.1.1, Apr. 2018, 55 pages.
(Continued)

*Primary Examiner* — Noel R Beharry
*Assistant Examiner* — Angelie T Ngo
(74) *Attorney, Agent, or Firm* — SLATER MATSIL, LLP

(57) ABSTRACT

An RRC connection method, including generating, by a first terminal, a first RRC message, and sending, by the first terminal, a first indication and first data to a second terminal through a first path, where the first path is a wireless communications interface between the first terminal and the second terminal, the first data includes the first RRC message, and the first indication is used to indicate the second terminal to send the first RRC message to a radio access network device.

18 Claims, 5 Drawing Sheets

(51) Int. Cl.
*H04W 72/044* (2023.01)
*H04W 80/02* (2009.01)

(56) References Cited

U.S. PATENT DOCUMENTS

| | | | | |
|---|---|---|---|---|
| 2018/0199229 A1* | 7/2018 | Lee | .................... | H04W 72/569 |
| 2019/0261450 A1* | 8/2019 | Adachi | ................ | H04W 76/11 |
| 2019/0364437 A1* | 11/2019 | Kamei | ................ | H04W 48/20 |
| 2020/0059292 A1* | 2/2020 | Kim | ....................... | H04W 74/08 |
| 2020/0077253 A1* | 3/2020 | Kim | ....................... | H04W 76/30 |
| 2020/0288535 A1* | 9/2020 | Sharma | ............ | H04W 36/0033 |
| 2022/0015160 A1* | 1/2022 | Xu | ........................ | H04W 76/10 |

FOREIGN PATENT DOCUMENTS

| | | |
|---|---|---|
| CN | 106888494 A | 6/2017 |
| CN | 107637162 A | 1/2018 |
| CN | 108605320 A | 9/2018 |
| EP | 3163966 A1 | 5/2017 |
| GB | 2548374 A | 9/2017 |
| WO | 2018063082 A1 | 4/2015 |
| WO | 2016164714 A1 | 10/2016 |
| WO | 2017166140 A1 | 10/2017 |
| WO | 2018028694 A1 | 2/2018 |
| WO | 2018145292 A1 | 8/2018 |

OTHER PUBLICATIONS

"Uni-Directional Sidelink UE-to-NW Relaying," Agenda Item: 6.2.9.2.3.1, Source: Qualcomm Incorporated, Document for: Discussion/Decision, 3GPP TSG RAN WG1 Meeting #89, R1-1708815, May 15-19, 2017, 5 pages.

"RRC Relay Handover Procedure for Remote UE," Agenda item: 9.1.2.3, Source: LG Electronics Inc., Document for: Discussion and Decision, 3GPP TSG-RAN WG2 Meeting #97, R2-1701270, Athens, Greece, Feb. 13-17, 17, 2017, 4 pages.

* cited by examiner

SYSTEM AND METHOD FOR RRC CONNECTION USING A RELAY TERMINAL

CROSS-REFERENCE TO RELATED APPLICATIONS

This application is a continuation of International Application No. PCT/CN2019/104596, filed on Sep. 5, 2019, which claims priority to Chinese Patent Application No. 201811044515.6, filed on Sep. 7, 2018. The disclosures of the aforementioned applications are hereby incorporated by reference in their entireties.

TECHNICAL FIELD

Embodiments of this application relate to the field of communications technologies, and in particular, to a radio resource control (RRC) connection method, a device, and a system.

BACKGROUND

An existing relay technology specifies that a remote device and a base station can communicate with each other through a relay device. For example, when the remote device needs to send user plane data or control plane data (for example, an RRC message) to the base station, the remote device may send the user plane data or the control plane data to the relay device through a wireless communications interface (for example, a PC5 interface) between the remote device and the relay device, and the relay device may send the user plane data or the control plane data of the remote device to the base station through a wireless communications interface between the relay device and the base station. Correspondingly, when the base station needs to send user plane data or control plane data to the remote device, the base station may also send the user plane data or the control plane data to the remote device through the relay device.

Although an existing relay technical standard specifies how the remote device and the base station transmit user plane data or control plane data to each other, no corresponding specification is made for establishing an RRC connection between the remote device and the base station.

SUMMARY

Embodiments of this application provide an RRC connection method, a device, and a system, to implement an RRC connection between a remote device and a base station.

To achieve the foregoing objective, the embodiments of this application provide the following technical solutions.

According to a first aspect of the embodiments of this application, an RRC connection method is provided. The method may include generating, by a first terminal, a first RRC message, and sending a first indication and first data to a second terminal through a wireless communications interface between the first terminal and the second terminal, where the first indication is used to indicate the second terminal to send the first RRC message to a radio access network device. Based on the method provided in the first aspect, the first terminal may send an indication and an RRC message to the second terminal, where the indication is used to indicate to send the RRC message to the radio access network device, and send the RRC message to the radio access network device through the second terminal. In this way, after receiving the RRC message sent by the first terminal, the second terminal sends the RRC message to the radio access network device, to implement an RRC connection between the first terminal and the radio access network device.

With reference to the first aspect, in a possible design of the first aspect, the first indication is included in the first data, and the first indication is an identifier of a first logical channel of the first path, or the first data is a packet data convergence protocol (PDCP) protocol data unit (PDU), and the first indication is included in the PDCP PDU, or the first data is a radio link control (RLC) PDU, and the first indication is included in the RLC PDU, or the first data is a media access control (MAC) PDU, and the first indication is included in the MAC PDU, or the first indication is included in sidelink control information (SCI), and the SCI is sent to the second terminal before the first terminal sends the first data to the second terminal. The first indication is transmitted on a sidelink control channel (PSCCH), and the first data is transmitted on a physical sidelink shared channel (PSSCH), and a time domain resource occupied by the PSCCH is different from a time domain resource occupied by the PSSCH, or a frequency domain resource occupied by the PSCCH is different from a frequency domain resource occupied by the PSSCH, or a frequency domain resource occupied by the PSCCH is different from a frequency domain resource occupied by the PSSCH and a time domain resource occupied by the PSCCH is different from a frequency domain resource occupied by the PSSCH. In this way, the second terminal may be indicated, in a plurality of manners such as a logical channel identifier, a protocol layer indication, or SCI, to send the RRC message to the radio access network device, thereby improving flexibility of design forms of the first indication.

With reference to the first aspect or the first possible design of the first aspect, in a second possible design of the first aspect, before the sending, by the first terminal, a first indication and first data to a second terminal through a first path, the method further includes receiving, by the first terminal, a discovery message sent by one or more terminals including the second terminal, where the discovery message sent by each terminal includes any one or more pieces of information of a cell identifier of a serving cell of the terminal, a time advance (TA) from the terminal to the radio access network device, a hop count from the terminal to the radio access network device, a group identifier of a group in which the terminal is located, quality of a transmission link between the terminal and the radio access network device, and quality of a transmission link between the terminal and the first terminal, and determining, based on the discovery message sent by the one or more terminals, that the first RRC message is to be forwarded by the second terminal. In this way, only before the first terminal sends the first indication and the first RRC message to the second terminal, and after the first terminal determines that the second terminal meets a condition for sending the first RRC message to the radio access network device, the first terminal sends the first indication and the first RRC message to the second terminal. In this case, to help the second terminal determine that the first data sent by the first terminal is sent to the second terminal, the first data may further include an identifier of the second terminal or an identifier of a group in which the second terminal is located.

With reference to the first aspect or the first possible design of the first aspect, in a third possible design of the first aspect, the first data further includes any one or more pieces of information of a preset TA threshold from the terminal to the radio access network device and a preset hop count threshold from the terminal to the radio access network device, and the any one or more pieces of information of the TA threshold and the hop count threshold are used by the second terminal to determine to send the first RRC message. In this way, when the first terminal sends the first data to the second terminal, some conditions used to determine whether the second terminal can send the first RRC message to the radio access network device may also be sent to the second terminal, so that the second terminal determines, based on these conditions, to send the first RRC message to the radio access network device.

With reference to any one of the first aspect or the foregoing possible designs, in a fourth possible design of the first aspect, the method further includes receiving, by the first terminal, a second RRC message that is sent by the second terminal through the first path, where the second RRC message includes an identifier of a second logical channel of the first path. In this way, the first terminal establishes a mapping between the second logical channel and a signaling radio bearer (signal radio barrier, SRB) 1 between the first terminal and the radio access network device. Subsequently, provided that an RRC message is received from the second logical channel, it is considered that the RRC message is an RRC message sent by the radio access network device to the first terminal, and the RRC message is directly delivered to an RRC layer of the first terminal for processing.

With reference to the fourth possible design of the first aspect, in a fifth possible design of the first aspect, the second RRC message is from the radio access network device, there is a mapping relationship between the identifier of the second logical channel and the signaling radio bearer (SRB) 1 of the first terminal, and the SRB 1 of the first terminal is a signaling radio bearer between the first terminal and the radio access network device, and the method further includes receiving, by the first terminal, a third RRC message that is sent by the second terminal through the second logical channel, and sending, by the first terminal based on the mapping relationship between the identifier of the second logical channel and the SRB 1, the third RRC message to a PDCP layer corresponding to the SRB 1 for processing. In other words, the RRC message subsequently received by the first terminal from the second logical channel is the RRC message sent by the radio access network device, and the received RRC message may be directly delivered to an RRC layer of the first terminal for processing.

With reference to the fifth possible design of the first aspect, in a sixth possible design of the first aspect, when the second logical channel is multiplexed by the RRC message and other data (or messages) that are sent by the radio access network device to the first terminal, to identify the RRC message sent by the radio access network device to the first terminal on the second logical channel, the method further includes receiving, by the first terminal, an indication message sent by the second terminal, where the indication message is used to indicate that the third RRC message is from the radio access network device. In this way, the first terminal may determine, based on the indication message, that the received third RRC message is the RRC message sent by the radio access network device, and deliver the received third RRC message to the RRC layer of the first terminal for processing.

With reference to any one of the fourth possible design of the first aspect to the sixth possible design of the first aspect, in a seventh possible design of the first aspect, the first RRC message further includes a first request, and the first request is used to request the radio access network device to include a cell identifier of a serving cell of the first terminal to the second RRC message, and the second RRC message includes the cell identifier of the serving cell of the first terminal. In this way, the radio access network device may determine a cell to which the first terminal is connected.

According to a second aspect, this application provides a communications apparatus. The communications apparatus may be a first terminal, or a chip or a system-on-a-chip in the first terminal. The communications apparatus may implement functions performed by the first terminal in the foregoing aspect or the possible designs, and the functions may be implemented by hardware, or by hardware by executing corresponding software. The hardware or the software includes one or more modules corresponding to the foregoing functions. For example, the communications apparatus may include a generation unit and a sending unit.

The generation unit is configured to generate a first RRC message.

The sending unit is configured to send a first indication and first data to a second terminal through a wireless communications interface between the first terminal and the second terminal, where the first indication is used to indicate the second terminal to send the first RRC message to a radio access network device.

For a specific implementation of the communications apparatus, refer to behavior functions of the first terminal in the RRC connection method provided in any one of the first aspect or the possible designs of the first aspect. Details are not described herein again. Therefore, the provided communications apparatus can achieve same beneficial effects as any one of the first aspect or the possible designs of the first aspect.

According to a third aspect, a communications apparatus is provided. The communications apparatus includes a processor and a memory. The memory is configured to store a computer execution instruction. When the communications apparatus runs, the processor executes the computer execution instruction stored in the memory, to enable the communications apparatus to perform the RRC connection method according to any one of the first aspect or the possible designs of the first aspect.

According to a fourth aspect, a computer-readable storage medium is provided. The computer-readable storage medium stores an instruction. When the instruction is run on a computer, the computer is enabled to be capable of performing the RRC connection method according to any one of the first aspect or the possible designs of the foregoing aspects.

According to a fifth aspect, a computer program product including an instruction is provided. When the computer program product runs on a computer, the computer is enabled to be capable of performing the RRC connection method according to any one of the first aspect or the possible designs of the foregoing aspects.

According to a sixth aspect, a chip system is provided. The chip system includes a processor and a communications interface, and is configured to support a communications apparatus in implementing functions in the foregoing aspects. For example, the processor generates a first RRC message, and sends a first indication and first data to a second terminal through a wireless communications interface between a first terminal and a second terminal, where the first indication is used to indicate the second terminal to send the first RRC message to a radio access network device. In a possible design, the chip system further includes a memory, and the memory is configured to store a program instruction and data that are necessary for the communications apparatus. The chip system may include a chip, or may include a chip and another discrete device.

For technical effects brought by any design in the third aspect to the sixth aspect, refer to technical effects brought by any one of the first aspect or the possible designs of the first aspect. Details are not described again.

According to a seventh aspect of the embodiments of this application, an RRC connection method is further provided. The method may include receiving, by a second terminal, a first indication and first data that are sent by a first terminal through a first path, where the first data includes a first RRC message, and the first indication is used to indicate the second terminal to send the first RRC message to a radio access network device, and sending second data according to the first indication, where the second data includes an identifier of the first terminal and the first RRC message. Based on the method provided in the seventh aspect, the second terminal may forward, to the radio access network device, the RRC message sent by the first terminal, to implement an RRC connection between the first terminal and the radio access network device.

With reference to the seventh aspect, in a first possible design of the seventh aspect, the first indication is included in the first data, and the first indication is an identifier of a first logical channel of the first path, or the first data is a PDCP PDU, and the first indication is included in the PDCP PDU, or the first data is an RLC PDU, and the first indication is included in the RLC PDU, or the first data is a MAC PDU, and the first indication is included in the MAC PDU, or the first indication is included in SCI, and the SCI is sent to the second terminal before the first terminal sends the first data to the second terminal, where the first indication is transmitted on a sidelink control channel (physical sidelink control channel, PSCCH), and the first data is transmitted on a physical sidelink shared channel (physical sidelink shared channel, PSSCH), and a time domain resource occupied by the PSCCH is different from a time domain resource occupied by the PSSCH, or a frequency domain resource occupied by the PSCCH is different from a frequency domain resource occupied by the PSSCH, or a frequency domain resource occupied by the PSCCH is different from a frequency domain resource occupied by the PSSCH and a time domain resource occupied by the PSCCH is different from a frequency domain resource occupied by the PSSCH. In this way, the second terminal may be indicated, in a plurality of manners such as a logical channel identifier, a protocol layer indication, or SCI, to send the RRC message to the radio access network device, thereby improving flexibility of design forms of the first indication.

With reference to the seventh aspect or the first possible design of the seventh aspect, in a second possible design of the seventh aspect, the second terminal sends the second data to the radio access network device through a data radio bearer (DRB) between the second terminal and the radio access network device, or the second terminal sends the second data to the radio access network device through a signaling radio bearer SRB 1 between the second terminal and the radio access network device. In other words, the second terminal may directly send the second data to the radio access network device in a plurality of manners such as the DBR or the SRB between the second terminal and the radio access network device. The sending manners are flexible.

With reference to the seventh aspect or the first possible design of the seventh aspect, in a third possible design of the seventh aspect, the sending, by the second terminal, second data includes sending, by the second terminal, the second data including a second indication to a third terminal, where the second indication is used to indicate the third terminal to send the second data including the first RRC message to the radio access network device. In this way, the RRC message sent by the first terminal may be forwarded to the radio access network device through the second terminal and the third terminal, to implement an RRC connection between the first terminal and the radio access network device.

With reference to the seventh aspect or any possible design of the seventh aspect, in a fourth possible design of the seventh aspect, the method further includes receiving, by the second terminal, third data, where the third data includes the identifier of the first terminal and a second RRC message, and the second RRC message includes an identifier of a second logical channel of the first path, and sending, by the second terminal, the second RRC message to the first terminal through the first path based on the identifier of the first terminal. In this way, after receiving the identifier of the second logical channel, the first terminal establishes a mapping between the second logical channel and a signaling radio bearer (signal radio barrier, SRB) 1 between the first terminal and the radio access network device. Subsequently, provided that an RRC message is received from the second logical channel, it is considered that the RRC message is an RRC message sent by the radio access network device to the first terminal, and the RRC message is directly delivered to an RRC layer of the first terminal for processing.

With reference to the fourth possible design of the seventh aspect, in a fifth possible design of the seventh aspect, the third data further includes the identifier of the second logical channel, or the method further includes receiving, by the second terminal, a fourth RRC message, where the fourth RRC message is from the radio access network device, and the fourth RRC message includes the identifier of the second logical channel. In this way, the radio access network device or a previous hop of the second terminal may indicate the identifier of the second logical channel to the second terminal, so that the second terminal sends, to the first terminal through the second logical channel based on the identifier of the second logical channel, subsequently received data or the RRC message that is sent by the radio access network device to the first terminal.

With reference to any one of the seventh aspect or the possible designs of the seventh aspect, in a sixth possible design of the seventh aspect, before the receiving, by a second terminal, a first indication and first data that are sent by a first terminal through a first path, the method further includes sending, by the second terminal, a discovery message to the first terminal, where the discovery message includes any one or more pieces of information of a cell identifier of a serving cell that is of the terminal, a TA from the second terminal to the radio access network device, a hop count from the second terminal to the radio access network device, a group identifier of a group in which the second terminal is located, quality of a transmission link between the second terminal and the radio access network device, and quality of a transmission link between the second terminal and the first terminal. In this way, before sending the first indication and the first RRC message to the second terminal, the first terminal may send the first indication and the first RRC message to the second terminal only after determining, based on the discovery message sent by the second terminal, that the second terminal meets the condition for sending the first RRC message to the radio access network device. In this case, to help the second terminal determine that the first data sent by the first terminal is sent to the second terminal, the first data may further include an identifier of the second terminal or an identifier of a group in which the second terminal is located.

With reference to any one of the seventh aspect or the possible designs of the seventh aspect, in a seventh possible design of the seventh aspect, the first data further includes any one or more pieces of information of a preset TA threshold from the terminal to the radio access network device and a preset hop count threshold from the terminal to the radio access network device, and before the sending, by the second terminal, second data, the method further includes determining, by the second terminal based on the any one or more pieces of information of the TA threshold and the hop count threshold, to send the second data. In this way, when the first terminal sends the first data to the second terminal, some conditions used to determine whether the second terminal can send the first RRC message to the radio access network device may also be sent to the second terminal, so that the second terminal determines, based on these conditions, to send the first RRC message to the radio access network device.

According to an eighth aspect, this application provides a communications apparatus. The communications apparatus may be a second terminal, or a chip or a system-on-a-chip in the second terminal. The communications apparatus may implement functions performed by the second terminal in the seventh aspect or the possible designs of the seventh aspect, and the functions may be implemented by hardware, or by hardware by executing corresponding software. The hardware or the software includes one or more modules corresponding to the foregoing functions. For example, the communications apparatus may include a receiving unit and a sending unit.

The receiving unit is configured to receive a first indication and first data that are sent by a first terminal through a first path, where the first data includes a first RRC message, and the first indication is used to indicate a second terminal to send the first RRC message to a radio access network device, and the sending unit is configured to send second data according to the first indication, where the second data includes an identifier of the first terminal and the first RRC message.

For a specific implementation of the communications apparatus, refer to behavior functions of the second terminal in the RRC connection method provided in any one of the seventh aspect or the possible designs of the seventh aspect. Details are not described herein again. Therefore, the provided communications apparatus can achieve same beneficial effects as any one of the seventh aspect or the possible designs of the seventh aspect.

According to a ninth aspect, a communications apparatus is provided. The communications apparatus includes a processor and a memory. The memory is configured to store a computer execution instruction. When the communications apparatus runs, the processor executes the computer execution instruction stored in the memory, to enable the communications apparatus to perform the RRC connection method according to any one of the seventh aspect or the possible designs of the seventh aspect.

According to a tenth aspect, a computer-readable storage medium is provided. The computer-readable storage medium stores an instruction. When the instruction is run on a computer, the computer is enabled to be capable of performing the RRC connection method according to any one of the seventh aspect or the possible designs of the foregoing aspects.

According to an eleventh aspect, a computer program product including an instruction is provided. When the computer program product runs on a computer, the computer is enabled to be capable of performing the RRC connection method according to any one of the seventh aspect or the possible designs of the foregoing aspects.

According to a twelfth aspect, a chip system is provided. The chip system includes a processor and a communications interface, and is configured to support a communications apparatus in implementing functions in the foregoing aspects. For example, the processor receives, through the communications interface, a first indication and first data that are sent by a first terminal through a first path, where the first data includes a first RRC message, and the first indication is used to indicate a second terminal to send the first RRC message to a radio access network device, send second data according to the first indication through the communications interface, where the second data includes an identifier of the first terminal and the first RRC message. In a possible design, the chip system further includes a memory, and the memory is configured to store a program instruction and data that are necessary for the communications apparatus. The chip system may include a chip, or may include a chip and another discrete device.

For technical effects brought by any design in the ninth aspect to the twelfth aspect, refer to technical effects brought by any one of the seventh aspect or the possible designs of the seventh aspect. Details are not described again.

According to a thirteenth aspect of the embodiments of this application, an RRC connection method is further provided. The method may include receiving, by an access network device from a wireless communications interface between a radio access network device and a second terminal, second data sent by the second terminal, where the second data includes an identifier of a first terminal and a first RRC message, and generating a second RRC message corresponding to the first RRC message. Based on the method provided in the thirteenth aspect, the radio access network device may receive, through the second terminal, the first RRC message initiated by the first terminal, and generate, based on the received first RRC message, the second RRC message used for connection, to implement an RRC connection between the radio access network device and the first terminal.

With reference to the thirteenth aspect, in a first possible design of the thirteenth aspect, the receiving, by an access network device from a second path, second data sent by the second terminal includes receiving, by the radio access network device, the second data from a DRB between the second terminal and the radio access network device. In other words, the radio access network device may receive, through the data radio bearer established between the radio access network device and the second terminal, the first RRC message forwarded by the second terminal.

With reference to the thirteenth aspect, in a second possible design of the thirteenth aspect, the receiving, by an access network device from a second path, second data sent by the second terminal includes receiving, by the radio access network device, the second data from an SRB 1 between the second terminal and the radio access network device. In other words, the radio access network device may receive, through the signaling radio bearer established between the radio access network device and the second terminal, the first RRC message forwarded by the second terminal.

With reference to the thirteenth aspect or any possible design of the thirteenth aspect, in a third possible design of the thirteenth aspect, the method further includes sending, by the access network device, the identifier of the first terminal and the second RRC message to the second terminal through the second path, where the second RRC message includes an identifier of a second logical channel of a first path. In this way, after receiving the identifier of the second logical channel, the first terminal sends the identifier of the second logical channel to the first terminal, so that the first terminal establishes a mapping between the second logical channel and the SRB 1 between the first terminal and the radio access network device. Subsequently, provided that an RRC message is received from the second logical channel, it is considered that the RRC message is an RRC message sent by the radio access network device to the first terminal, and the RRC message is directly delivered to an RRC layer of the first terminal for processing.

According to a fourteenth aspect, this application provides a communications apparatus. The communications apparatus may be a radio access network device, or a chip or a system-on-a-chip in the radio access network device. The communications apparatus may implement functions performed by the radio access network device in any one of the thirteenth aspect or the possible designs of the thirteenth aspect, and the functions may be implemented by hardware, or by hardware by executing corresponding software. The hardware or the software includes one or more modules corresponding to the foregoing functions. For example, the communications apparatus may include a receiving unit and a generation unit.

The receiving unit is configured to receive, from a wireless communications interface between the radio access network device and a second terminal, second data sent by the second terminal, where the second data includes an identifier of a first terminal and a first RRC message, and the generation unit is configured to generate a second RRC message corresponding to the first RRC message.

For a specific implementation of the communications apparatus, refer to behavior functions of the radio access network device in the RRC connection method provided in any one of the thirteenth aspect or the possible designs of the thirteenth aspect. Details are not described herein again. Therefore, the provided communications apparatus can achieve same beneficial effects as any one of the thirteenth aspect or the possible designs of the thirteenth aspect.

According to a fifteenth aspect, a communications apparatus is provided. The communications apparatus includes a processor and a memory, where the memory is configured to store a computer execution instruction. When the communications apparatus runs, the processor executes the computer execution instruction stored in the memory, to enable the communications apparatus to perform the RRC connection method according to any one of the thirteenth aspect or the possible designs of the thirteenth aspect.

According to a sixteenth aspect, a computer-readable storage medium is provided. The computer-readable storage medium stores an instruction. When the instruction is run on a computer, the computer is enabled to be capable of performing the RRC connection method according to any one of the thirteenth aspect or the possible designs of the foregoing aspects.

According to a seventeenth aspect, a computer program product including an instruction is provided. When the computer program product runs on a computer, the computer is enabled to be capable of performing the RRC connection method according to any one of the thirteenth aspect or the possible designs of the foregoing aspects.

According to an eighteenth aspect, a chip system is provided. The chip system includes a processor and a communications interface, and is configured to support a communications apparatus in implementing functions in the foregoing aspects. For example, the processor receives, from a wireless communications interface between a radio access network device and a second terminal, second data sent by the second terminal, where the second data includes an identifier of a first terminal and a first RRC message, and generates a second RRC message corresponding to the first RRC message. In a possible design, the chip system further includes a memory, and the memory is configured to store a program instruction and data that are necessary for the communications apparatus. The chip system may include a chip, or may include a chip and another discrete device.

For technical effects brought by any design of the fifteenth aspect to the eighteenth aspect, refer to technical effects brought by any one of the thirteenth aspect or the possible designs of the thirteenth aspect. Details are not described again.

According to a nineteenth aspect, this application provides an RRC connection system, including the communications apparatus according to the second aspect to the sixth aspect, the communications apparatus according to the eighth aspect to the twelfth aspect, and the communications apparatus according to the fourteenth aspect to the eighteenth aspect.

BRIEF DESCRIPTION OF THE DRAWINGS

FIG. 4-1 is a schematic diagram of a multiplexing relationship between a control channel and a data channel according to an embodiment of this application;

DETAILED DESCRIPTION OF ILLUSTRATIVE EMBODIMENTS

Figure 1:
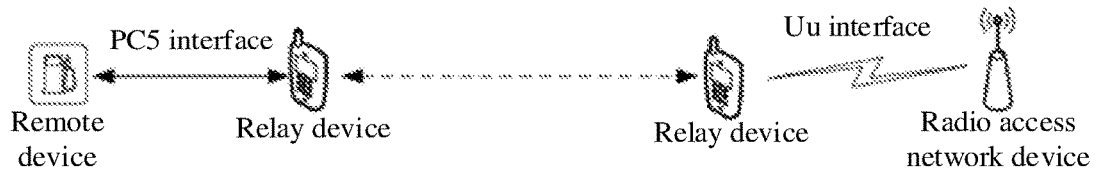
FIG. 1 is a schematic diagram of a system architecture according to an embodiment of this application.

First, to facilitate understanding of the embodiments of this application, some protocol stacks in the embodiments of this application are described.

RRC layer: The RRC layer is mainly responsible for RRC message generation, measurement configuration, and reporting, and may further be responsible for other functions, for example, sending a dedicated non-access stratum (NAS)

message, and transmitting user equipment (UE) access capability information. RRC messages are classified into cell-level messages and UE-level messages. For example, system broadcast messages and the like are cell-level RRC messages, and RRC connection control messages and the like are UE-level RRC messages.

A UE-level RRC message is transmitted through a signaling radio bearer (SRB). An existing protocol defines three types of SRBs: an SRB 0, an SRB 1, and an SRB 2. SRB 0: The SRB 0 is a default radio bearer. RRC messages using the SRB 0 are transparent at a PDCP layer, and neither integrity protection nor encryption and decryption processing is performed. These messages are sent by using a common control channel (CCCH). SRB 1: The SRB 1 is used to send RRC messages, and these messages are sent by using a dedicated control channel (DCCH). SRB 2: The SRB 2 is used to send RRC messages including NAS messages. The SRB 2 has a lower priority than SRB 1, and the SRB 2 is always configured after security activation. In addition to the SRB 0, each SRB has a corresponding PDCP layer for integrity protection, and encryption and decryption, and each PDCP layer has one or two corresponding RLC layers.

PDCP layer: The PDCP layer mainly processes an RRC message from a control plane and an IP packet from a data plane. Functions of the PDCP layer include header compression and decompression, encryption/decryption, integrity protection, transmission of user data and control plane data, reordering, retransmission, and the like.

RLC layer: The RLC layer is mainly responsible for segmenting/concatenating and reassembling RLC service data units (SDU), performing error correction by using an automatic repeat request (ARQ), performing reordering and duplicate packet detection on RLC protocol data units (PDU), re-segmenting RLC PDUs, and the like.

MAC layer: The MAC layer is mainly responsible for matching a logical channel and a transport channel, multiplexing a plurality of MAC SDUs that belong to one logical channel or belong to different logical channels into a same MAC PDU, sending the MAC PDU to a PHY (physical) layer, and performing error correction, scheduling, logical channel priority processing, scheduling information reporting, random access process processing, or the like by using a hybrid automatic repeat request (HARQ).

PHY layer: The PHY layer specifies that mechanical, electronic, functional, and procedural characteristics are provided to create, maintain, and delete a physical link required for data transmission. In brief, the PHY layer ensures that original data can be transmitted over a variety of physical media.

The following describes the technical solutions in the embodiments of this application with reference to the accompanying drawings in the embodiments of this application.

The solutions provided in the embodiments of this application are applicable to a relay system shown in FIG. 1. The relay system may be a long term evolution (LTE) or new radio (NR) system, and is configured to implement an RRC connection between a remote device and a radio access network device. As shown in FIG. 1, the relay system may include a remote device, relay devices, and a radio access network device. The remote device may be a device that is relatively far away from the radio access network device. The remote device cannot be directly connected to the radio access network device, but is connected to the radio access network device through one or more relay devices. A wireless communications interface (for example, a PC5 interface or a sidelink) may be established between the remote device and a relay device, and a wireless communications interface (for example, an LTE air interface or an NR air interface) may be established between a relay device closest to the radio access network device and the radio access network device. It should be noted that the network architecture shown in FIG. 1 is merely an example architecture diagram. Although not shown, in addition to the network function entities shown in FIG. 1, the network shown in FIG. 1 may further include another function entity, for example, a core network element. This is not limited.

For example, the remote device in FIG. 1 may be remote user equipment (remote UE), for example, may be a wearable device (a smartwatch, a smart band, or the like), or may be smart furniture (or household appliances), a car in the internet of vehicles, a robotic arm in the industrial internet, or other devices such as intelligent refueling devices that are relatively far away from the radio access network device and need to be connected to the radio access network device through a relay device.

The relay device in FIG. 1 may be relay user equipment (relay UE). For example, the relay device may be any handheld device, vehicle-mounted device, wearable device, or computing device that has a wireless communication function, or another processing device connected to a wireless modem. The relay device may alternatively be but is not limited to a subscriber unit, a cellular phone, a smartphone, a wireless data card, a personal digital assistant (PDA) computer, a tablet computer, a wireless modem, a handheld device, a laptop computer, a cordless phone, a wireless local loop (WLL) station, a machine type communication (MTC) terminal, a mobile station (MS), or the like.

The radio access network device in FIG. 1 may also be named as an access network device, and is mainly configured to implement functions such as a radio physical entity function, resource scheduling and radio resource management, radio access control, and mobility management. For example, the radio access network device may be a radio access network (RAN) next-generation NodeB (generation nodeB, gNB), an LTE NodeB eNB, or any other access unit.

Figure 2:
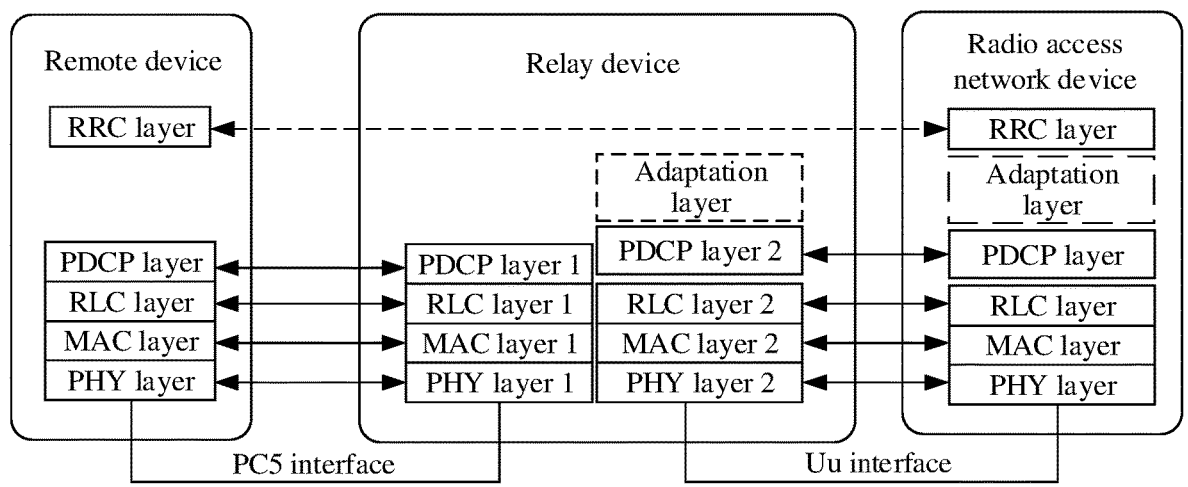
FIG. 2 is a schematic diagram of a protocol stack according to an embodiment of this application.

For example, the remote device and the radio access network device communicate with each other through a relay device. Protocol stacks shown in FIG. 2 may be established between the remote device, the relay device, and the radio access network device. As shown in FIG. 2, the remote device may include an RRC layer, a PDCP layer, an RLC layer, a MAC layer, and a PHY layer. The relay device may include a PDCP layer 1, an RLC layer 1, a MAC layer 1, and a PHY layer 1, and may further include a PDCP layer 2, an RLC layer 2, a MAC layer 2, and a PHY layer 2. The access network device may include an RRC layer, a PDCP layer, an RLC layer, a MAC layer, and a PHY layer. For example, the RRC layer of the remote device is corresponding to the RRC layer of the radio access network device, and a wireless communications interface technology, for example, an LTE or NR air interface technology, is used between the two. Dashed lines between the RRC layer of the remote device and the RRC layer of the radio access network device indicate that no RRC connection has been established between the remote device and the radio access network device. For example, the PDCP layer, the RLC layer, the MAC layer, and the PHY layer of the remote device are corresponding to the PDCP layer 1, the RLC layer 1, the MAC layer 1, and the PHY1 layer of the relay device. A wireless communications interface technology between the remote device and the relay device, for example, an air interface technology such as a PC5 interface or a sidelink, is used between these protocol layers. The PDCP layer 2, the RLC layer 2, the MAC layer 2, and the PHY layer 2 of the relay device are corresponding to the PDCP layer, the RLC layer, the MAC layer, and the PHY layer of the radio access network device. A wireless communications interface technology between the relay device and the radio network device is used between these protocol layers. In addition to these protocol layers, as shown in FIG. 2, the relay device and the radio access network device may further include an adaptation (adaptation) layer. For example, the adaptation layer may be a newly added protocol layer in the embodiments of this application. The adaptation layer in the relay device is corresponding to the adaptation layer in the radio access network device, and a wireless communications interface technology between the relay device and the radio access network device is used between the two.

It should be noted that, the names of the network elements, the names of the interfaces between the network elements, and the names of the protocol stacks that are in the architecture in FIG. 1 are merely examples. In specific implementation, the network elements, the interfaces between the network elements, and the protocol stacks can have other names. This is not specifically limited in the embodiments of this application.

Figure 3:
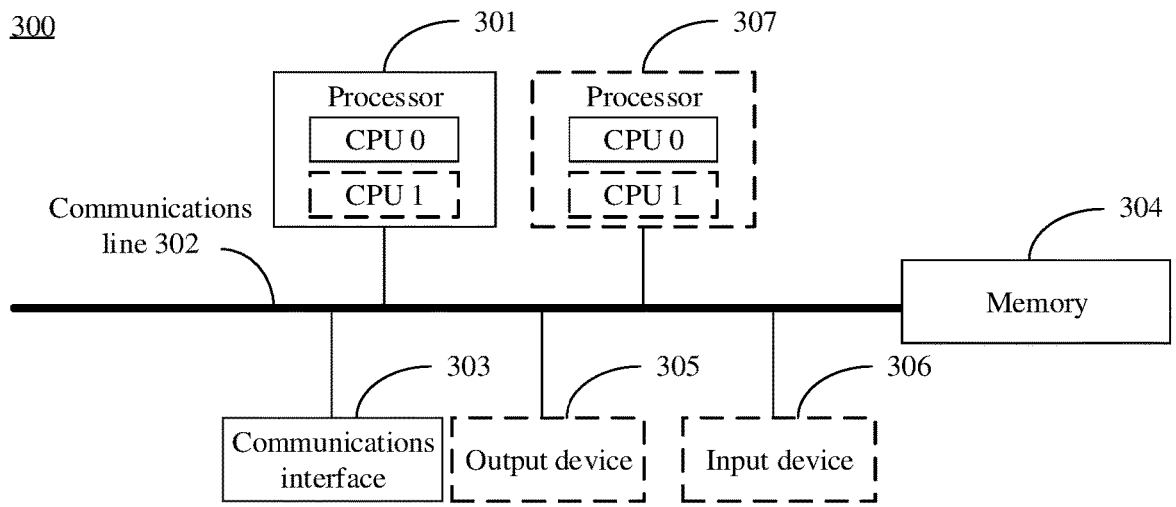
FIG. 3 is a schematic composition diagram of a communications apparatus according to an embodiment of this application.

For example, the remote device, the relay devices, and the radio access network device in FIG. 1 may be referred to as communications apparatuses or communications apparatuses (for example, a chip or a system-on-a-chip) configured to implement the RRC connection method provided in the embodiments of this application. To implement the RRC connection method provided in the embodiments of this application, these communications apparatuses may include components shown in FIG. 3. FIG. 3 is a schematic composition diagram of a communications apparatus 300 according to an embodiment of this application. As shown in FIG. 3, the communications apparatus 300 includes at least one processor 301, a communications line 302, and at least one communications interface 303. Further, the communications apparatus 300 may further include a memory 304. For example, the processor 301, the memory 304, and the communications interface 303 may be connected through the communications line 302. In this embodiment of this application, "at least one" may be one, two, three, or more. This is not limited in this embodiment of this application.

In this embodiment of this application, the processor 301 may be a central processing unit (CPU), a general purpose processor, a network processor (NP), a digital signal processor (DSP), a microprocessor, a microcontroller, a programmable logic device (PLD), or any combination thereof. The processor may alternatively be any other apparatus having a processing function, for example, a circuit, a component, or a software module.

In this embodiment of this application, the communications line 302 may include a path, used to transmit information between the components included in the communications apparatus.

In this embodiment of this application, the communications interface 303 is configured to communicate with another device or communications network (for example, Ethernet, a radio access network (RAN), or a wireless local area network (WLAN)). The communications interface 303 may be a module, a circuit, a transceiver, or any apparatus that can implement communication.

In this embodiment of this application, the memory 304 may be a read-only memory (ROM) or another type of static storage device that can store static information and/or an instruction, or may be a random access memory (RAM) or another type of dynamic storage device that can store information and/or an instruction, or may be an electrically erasable programmable read-only memory (EEPROM), a compact disc read-only memory (CD-ROM) or another compact disc storage, an optical disc storage (including a compressed optical disc, a laser disc, an optical disc, a digital versatile disc, a Blu-ray disc, or the like), a magnetic disk storage medium or another magnetic storage device, or any other medium that can be used to carry or store expected program code in a form of an instruction or a data structure and that can be accessed by a computer, but is not limited thereto.

In a possible design, the memory 304 may be independent of the processor 301. To be specific, the memory 304 may be a memory outside the processor 301. In this case, the memory 304 may be connected to the processor 301 through the communications line 302, and is configured to store an instruction or program code. When invoking and executing the instruction or the program code stored in the memory 304, the processor 301 can implement the RRC connection methods provided in the following embodiments of this application. In another possible design, the memory 304 may alternatively be integrated with the processor 301. To be specific, the memory 304 may be an internal memory of the processor 301. For example, the memory 304 is a cache, and may be configured to temporarily store some data, instruction information, and/or the like.

In an implementable manner, the processor 301 may include one or more CPUs, for example, a CPU 0 and a CPU 1 in FIG. 3. In another implementable manner, the communications apparatus 300 may include a plurality of processors, for example, the processor 301 and a processor 307 in FIG. 3. In still another implementable manner, the communications apparatus 300 may further include an output device 305 and an input device 306. For example, the input device 306 may be a device, for example, a keyboard, a mouse, a microphone, or a joystick, and the output device 305 may be a device, for example, a display screen or a speaker.

It should be noted that the communications apparatus 300 may be a general-purpose device or a dedicated device. For example, the communications apparatus 300 may be a desktop computer, a portable computer, a network server, a PDA, a mobile phone, a tablet computer, a wireless terminal, an embedded device, a chip system, or a device with a structure similar to that in FIG. 3. A type of the communications apparatus 300 is not limited in this embodiment of this application. In this embodiment of this application, the chip system may include a chip, or may include a chip and another discrete device.

With reference to FIG. 1, the following specifically describes the RRC connection method provided in the embodiments of this application by using an example in which the remote device is a first terminal, and the one or more relay devices directly connected to the remote device are second terminals. It should be noted that in the following embodiments of this application, names of messages between network elements, names of parameters in messages, or the like are merely examples, and there may be other names in specific implementation. This is not specifically limited in the embodiments of this application.

Figure 4:
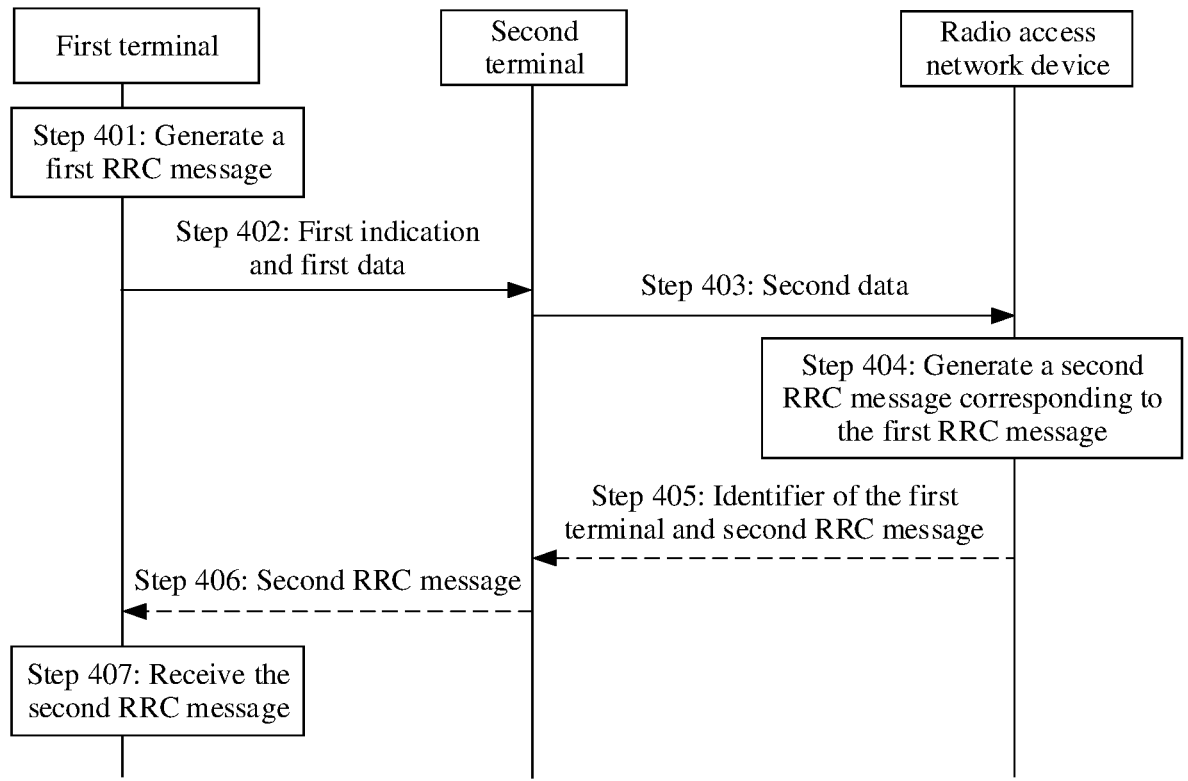
FIG. 4 is a flowchart of an RRC connection method according to an embodiment of this application.
Figures 1, 4:
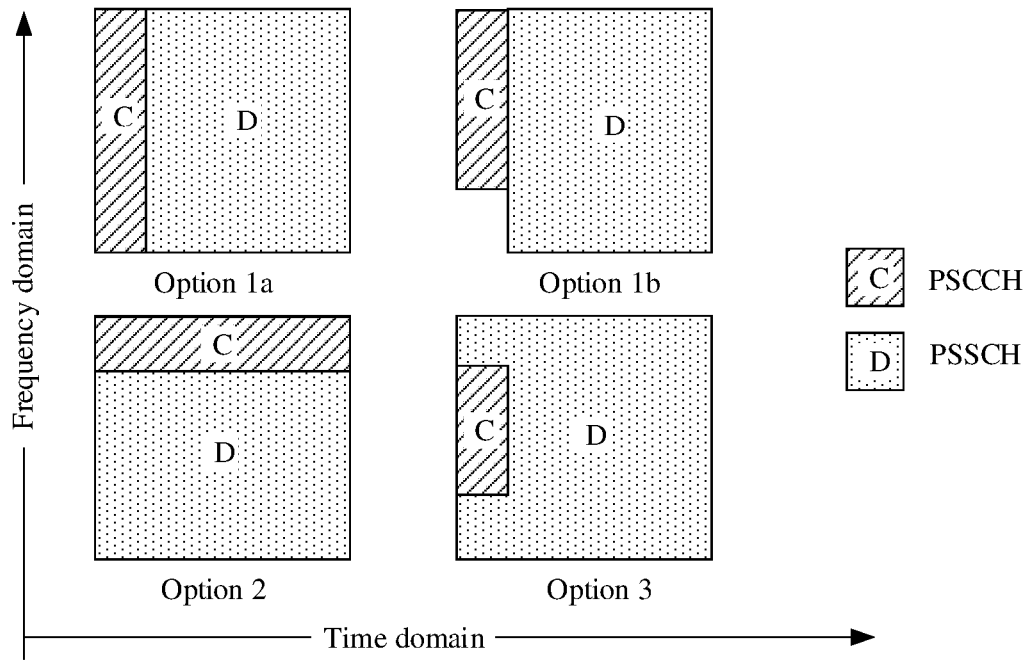

FIG. 4 shows an RRC connection method according to an embodiment of this application, to implement an RRC connection between a first terminal and a radio access network device. The method may be interactively performed by the first terminal, a second terminal, and the radio access network device. For example, a wireless communications interface, for example, a PC5 interface or a sidelink, is established between the first terminal and the second terminal, and the first terminal and the second terminal may communicate with each other through the PC5 interface or the sidelink. A wireless communications interface, for example, an LTE air interface or an NR air interface, is established between the second terminal and the radio access network device. For example, the LTE air interface may be a Uu interface, and the second terminal and the radio access network device may communicate with each other through the LTE air interface or the NR air interface. As shown in FIG. 4, the method may include step 401 to step 404.

Step 401: A first terminal generates a first RRC message.

For example, the first RRC message may be generated by an RRC layer of the first terminal, and the RRC layer of the first terminal is corresponding to an RRC layer of the radio access network device. The first RRC message may be used to request to establish an RRC connection to the radio access network device. For example, the first RRC message may be an RRC connection request (RRC connection request or RRC setup Request), or may be an RRC connection reestablishment request (RRC connection reestablishment request or RRC connection reestablishment request), or may be an RRC connection resume request (RRC connection resume request or RRC resume request), or another message. This is not limited.

The first RRC message may include but is not limited to a first request. The first request may be used to request a cell identifier of a serving cell of the first terminal. The cell identifier of the serving cell of the first terminal may be used to identify the serving cell of the first terminal. The cell identifier of the serving cell of the first terminal may be an LTE cell global identifier (ECGI), an NR cell global identifier (NR CGI), or a physical cell identifier (PCI). Optionally, if the first terminal has learned of the cell identifier of the serving cell of the first terminal before generating the first RRC message, the first RRC message may not include the first request. Optionally, the first RRC message may further include an identifier of the first terminal, for example, an identifier of the first terminal on a PC5 interface or a sidelink.

Step 402: The first terminal sends a first indication and first data to the second terminal through a first path.

For example, the first path may be a wireless communications interface between the first terminal and the second terminal, for example, a PC5 interface, a sidelink, or another device-to-device (D2D) link. The first path may include one or more logical paths (logic channel, LCH). The foregoing "sending a first indication and first data to the second terminal through a first path" may also be described as "sending a first indication and first data to the second terminal through a logical channel in a first path". Each logical channel is corresponding to an identifier (identity, ID), the logical channel identifier (logic channel identity, LCID) may be used to identify the logical channel, and the logical channel identifier may be an index number or the like of the logical channel. For example, it is assumed that the first terminal is UE 1, the second terminal is UE 2, and a first path between the UE 1 and the UE 2 includes five LCs. Identifiers corresponding to the five LCs may be an LCID 1, an LCID 2, an LCID 3, an LCID 4, and an LCID 5.

For example, the first data may include the first RRC message. For example, the first data may include a data packet header and a payload, and the first RRC message may be included in the payload of the first data. Specifically, after processing the first data by using a PDCP layer, an RLC layer, a MAC layer, and a PHY layer of the first terminal, the first terminal may send the first data to the second terminal through the first path between the first terminal and the second terminal. Optionally, to make the first data processed by using the PDCP layer, the RLC layer, the MAC layer, and the PHY layer of the first terminal suitable to be sent on the first path, specific formats of protocol stacks of the PDCP layer, the RLC layer, the MAC layer, and the PHY layer of the first terminal are specified in a protocol of the wireless communications interface between the first terminal and the second terminal. In this embodiment of this application, the first data processed by using the PDCP layer may be referred to as a PDCP protocol data unit (PDU), the first data processed by using the RLC layer may be referred to as an RLC PDU, and the data processed by using the MAC layer may be referred to as a MAC PDU.

For example, the first RRC message included in the first data remains unchanged after the first data is processed by using different protocol layers, but information included in a data packet header may be different after the first data is processed by using different protocol layers. For example, after the first data is processed by using the PDCP layer, the data packet header may include a PDCP sequence number. Subsequently, after the first data is processed by using the MAC layer, the data packet header may further include an LCID, a source address field, a destination address (target address) field, and the like in addition to a PDCP sequence number. The source address field may include the identifier of the first terminal, and the destination address field may include an identifier of the second terminal. For example, the LCID included in the data packet header of the first data may be used to identify a logical channel for transmitting the first data. The identifier of the first terminal may be used to identify the first terminal, and the identifier of the second terminal may be used to identify the second terminal. In this embodiment of this application, the identifier of the first terminal may be an identifier of the first terminal on the first path, for example, an identifier of the first terminal on a PC5 interface or a sidelink sidelink. The identifier of the second terminal may be an identifier of the second terminal on the first path, for example, an identifier of the first terminal on a PC5 interface or a sidelink sidelink.

An objective of this embodiment of this application is to implement an RRC connection between the first terminal and the radio access network device. Therefore, the first RRC message sent by the first terminal to the second terminal needs to be sent to the radio access network device. To enable the second terminal to send the first RRC message, the first indication in step 402 may be used to indicate the second terminal to send the first RRC message to the radio access network device, so that after receiving the first indication, the second terminal determines, according to the first indication, that data received from the first terminal is data to be sent to the radio access network device, and then, the second terminal sends the first RRC message to the radio access network device.

In a possible design, a protocol specifies that data transmitted on a logical channel (for example, a first logical channel) of the first path is data or an RRC message to be sent to the radio access network device. In this case, the first indication may be an identifier of the first logical channel, and the first indication is included in the first data. For example, when the first data is processed by using the MAC layer, the identifier of the first logical channel is included in the data packet header. For example, the protocol specification may refer to a rule that is agreed on in advance and that needs to be followed by both the first terminal and the second terminal. For example, the protocol specifies that data transmitted on an LCID 0 is data or an RRC message to be sent to the radio access network device. In this case, the first terminal may send, to the second terminal by using the LCID 0, the first data that includes the LCID 0 and the first RRC message. After receiving the first data, the second terminal may determine, based on the LCID 0 in the first data, to send the first RRC message to the radio access network device.

In another possible design, the first indication may be included in a PDCP PDU, to be specific, the first indication is included in the first data when the first data is processed by using the PDCP layer, for example, included in a PDCP header. Alternatively, the first indication may be included in an RLC PDU, to be specific, the first indication is included in the first data when the first data is processed by using the RCL layer, for example, included in an RLC packet header. Alternatively, the first indication may be included in a MAC PDU, to be specific, the first indication is included in the first data when the first data is processed by using the MAC layer, for example, included in a MAC header or a subheader. For example, the first indication may be a binary bit number 0 or 1 or another symbol. Specifically, which symbol is used to represent the first indication may be specified in a protocol in advance. This is not limited in this embodiment of this application. For example, the bit number "1" is used to indicate the second terminal to send the first RRC message to the radio access network device. When the first data is processed by using the PDCP layer, the first terminal may include the bit number "1" to the data packet header of the first data, and send the subsequently processed first data to the second terminal.

In addition to the existing PDCP layer, RLC layer, and MAC layer, a new protocol layer (or adaptation) (not shown in FIG. 2) may be further added to the first terminal. The newly added protocol layer is mainly responsible for encapsulating the first indication into the first data. In other words, the first indication may be included in the first data, for example, included in the adaptation layer packet header, when the first data is processed by using the newly added protocol layer. For example, the newly added protocol layer may be deployed above the PDCP layer, or deployed between the PDCP layer and the RLC layer, or deployed between the RLC layer and the MAC layer. This is not limited. Optionally, when the first indication is included in the first data after the first data is processed by using the newly added protocol layer, the first data may further include a newly added protocol layer indication, and the newly added protocol layer indication may be included in a PDCP PDU, an RLC PDU, a MAC PDU, or a PHY PDU. For example, a PDCP header, an RLC header, a MAC header, or a PHY layer header includes a newly added protocol layer indication, to indicate that there is a newly added protocol layer, so that the second terminal determines, according to the newly added protocol layer indication, to deliver the received first data to the newly added protocol layer of the second terminal for processing. For example, the newly added protocol layer of the second terminal is corresponding to a newly added protocol layer of the first terminal (that is, there is a peer-to-peer relationship), and the newly added protocol layer of the second terminal is mainly responsible for decapsulating the first data to obtain the first indication.

In still another possible design, the first indication is included in sidelink control information (SCI). The SCI may be sent to the second terminal before the first terminal sends the first data to the second terminal. For example, the bit number "1" is used to indicate the second terminal to send the first RRC message to the radio access network device. The first terminal may send the first data to the second terminal after the first terminal includes the bit number "1" to the SCI and sending the SCI to the second terminal.

In this embodiment of this application, the first indication is transmitted on a sidelink control channel (PSCCH), and the first data is transmitted on a physical sidelink shared channel (physical sidelink shared channel, PSSCH), and a time domain resource occupied by the PSCCH is different from a time domain resource occupied by the PSSCH, or a frequency domain resource occupied by the PSCCH is different from a frequency domain resource occupied by the PSSCH, or a frequency domain resource occupied by the PSCCH is different from a frequency domain resource occupied by the PSSCH and a time domain resource occupied by the PSCCH is different from a frequency domain resource occupied by the PSSCH.

For example, the PSSCH and the PSCCH may be multiplexed together and sent to the second terminal. For example, the PSSCH and the PSCCH may be sent by using four frame structures shown in FIG. 4-1. As shown in FIG. 4-1, the four frame structures are respectively the following options. Option 1a: The PSCCH and the PSSCH are in same frequency domain and do not overlap in time domain. Option 1b: The PSCCH and the PSSCH overlap in frequency domain but do not overlap in time domain. Option 2: The PSCCH and the PSSCH are in same time domain and do not overlap in frequency domain. Option 3: A part of the PSCCH and a part of the PSSCH are in same time domain and do not overlap in frequency domain, and a remaining part of the PSCCH and a remaining part of the PSSCH overlap in frequency domain but do not overlap in time domain.

Step 403: The second terminal receives the first indication and the first data that are sent by the first terminal through the first path, and sends second data according to the first indication.

When the first indication is included in the first data, the second terminal may process the first data received from the first path, by using a PHY layer, a MAC layer, an RLC layer, and a PDCP layer that are in the second terminal and that are corresponding to the first terminal, to obtain the identifier of the first terminal, the first indication, and the first RRC message, and send the second data according to the first indication. Optionally, when the first indication is processed by using a protocol layer newly added to the first terminal and is included in the first data, correspondingly, a protocol layer is also newly added to the second terminal, and the first data is processed by using the protocol layer, to obtain the first indication.

When the first indication is included in the SCI, after receiving the SCI from the first terminal, the second terminal receives, from the first path, the first data sent by the first terminal, processes the received first data by using the PHY layer, the MAC layer, the RLC layer, and the PDCP layer that are in the second terminal and that are corresponding to the first terminal, to obtain the identifier of the first terminal and the first RRC message, and sends the second data according to the first indication in the SCI.

For example, the PHY layer, the MAC layer, the RLC layer, and the PDCP layer that are in the second terminal and that are corresponding to the first terminal may be shown in FIG. 2. FIG. 2 shows a PHY layer 1, a MAC layer 1, an RLC layer 1, and a PDCP layer 1 that are in the second terminal and that are end-to-end connected to the PHY layer, the MAC layer, the RLC layer, and the PDCP layer of the first terminal. Specifically, for a process in which the first data is processed by using the PHY, the MAC layer, the RLC layer, and the PDCP layer that are in the second terminal and that are corresponding to the first terminal, refer to the prior art. Details are not described in this embodiment of this application.

For example, the second data may include the identifier of the first terminal and the first RRC message. For example, the second data may include a data packet header and a payload, the first RRC message may be included in the payload of the second data, and the identifier of the first terminal may be included in the data packet header of the second data. In another possibility, the second data may include the first RRC message, and the first RRC message may include the identifier of the first terminal. In this embodiment of this application, that the second terminal sends the second data may include the following two cases.

Case 1: No second path is established between the second terminal and the radio access network device. The second path is a wireless communications interface between the second terminal and the radio access network device, and the second path may be an LTE-standard air interface (LTE air interface) such as a Uu interface, or an NR-standard air interface (NR air interface) such as an Nu interface.

The second terminal may send the second data to another relay device (for example, the third terminal) through a direct connection path between the second terminal and the another relay device, and the another relay device sends the first RRC message to the radio access network device. Specifically, for the implementation process, refer to the following FIG. 5.

Case 2: A second path is established between the second terminal and the radio access network device.

Figure 5:
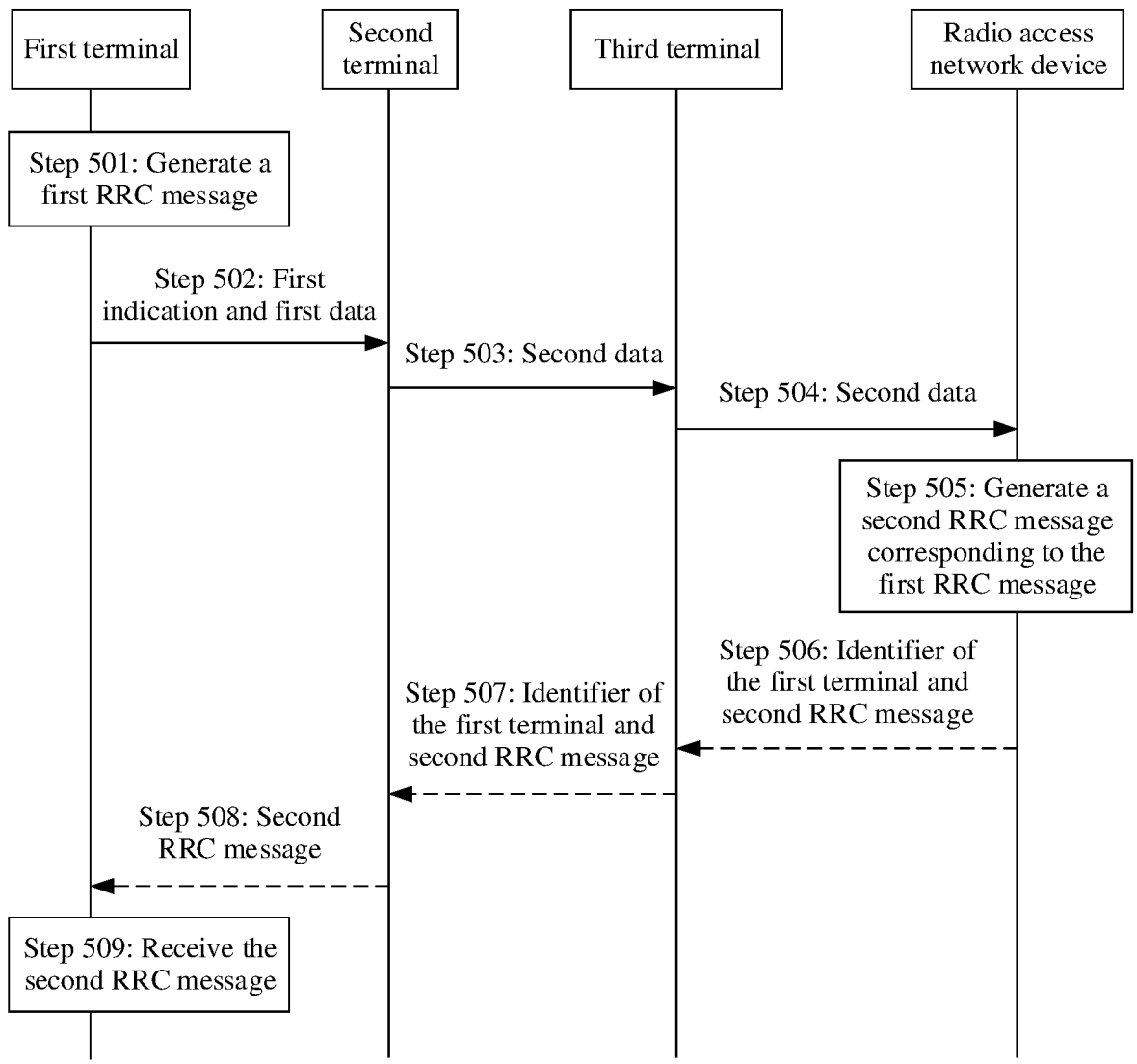
FIG. 5 is a flowchart of another RRC connection method according to an embodiment of this application.

As shown in FIG. 5, the second terminal may send the second data to the radio access network device through the second path. The second data may include the first RRC message, and may further include the identifier of the first terminal. Alternatively, in a possible design, the first RRC message includes the identifier of the first terminal. When the second data includes only the first RRC message, the second terminal needs to include an RRC message indication or an RRC connection request indication (or an SRB 0 indication) in the second data. The RRC message indication or the RRC connection request indication (or the SRB 0 indication) is used to indicate that data received by the radio access network device from the second path is an RRC message, an RRC connection request message, or an RRC message corresponding to an SRB 0. When receiving the second data, the radio access network device may determine, based on the RRC message indication or the RRC connection request indication (or the SRB 0 indication), that the received data is an RRC message, then obtain the identifier of the first terminal by reading the first RRC message, and determine, based on the identifier of the first terminal, that the RRC message is the RRC message sent by the first terminal. The implementation is as follows.

In a possible design, the second terminal sends the second data to the radio access network device through a data radio bearer (DRB) between the second terminal and the radio access network device. For example, after processing the second data by using a PDCP layer, an RLC layer, a MAC layer, and a PHY layer that are in the second terminal and that are corresponding to the radio access network device, the second terminal may send the second data to the radio access network device through the data radio bearer (DRB) between the second terminal and the radio access network device. For example, the PDCP layer, the RLC layer, the MAC layer, and the PHY layer that are in the second terminal and that are corresponding to the radio access network device may be shown in FIG. 2. FIG. 2 shows a PHY layer 2, a MAC layer 2, an RLC layer 2, and a PDCP layer 2 that are in the second terminal and that are end-to-end connected to a PHY layer, a MAC layer, an RLC layer, and a PDCP layer of the radio access network device.

Optionally, the first RRC message included in the second data remains unchanged after the second data is processed by using different protocol layers of the second terminal, but information included in a data packet header may be different after the data packet header of the second data is processed by using different protocol layers. For example, after the second data is processed by using the PDCP layer, the data packet header may include a PDCP sequence number. Subsequently, after the second data is processed by using the MAC layer, the data packet header may further include an LCID and the like in addition to the PDCP sequence number. In this possible design, the identifier of the first terminal may be included in the second data when the second data is processed by using the PDCP layer, or may be included in the second data when the second data is processed by using the RLC layer, or may be included in the second data when the second data is processed by using the MAC layer. In addition to the PDCP layer, the RLC layer, and the MAC layer, as shown in FIG. 2, a new protocol layer (for example, adaptation) corresponding to the radio access network device may be further added to the second terminal. The newly added protocol layer is mainly responsible for encapsulating the identifier of the first terminal into the second data, that is, the identifier of the first terminal may be included in the second data when the second data is processed by using the newly added protocol layer. For example, the newly added protocol layer in the second terminal may be deployed above the PDCP layer of the second terminal, or deployed between the PDCP layer and the RLC layer, or deployed between the RLC layer and the MAC layer. This is not limited. Optionally, when the identifier of the first terminal is included in the second data after the second data is processed by using the newly added protocol layer, the second data may further include a newly added protocol layer indication, and the newly added protocol layer indication may be included in the second data when the second data is processed by using the PDCP layer, the RLC layer, the MAC layer, or the PHY layer, so that the radio access network device determines, according to the newly added protocol layer indication, to deliver the received second data to the newly added protocol layer of the radio access network device for processing. For example, there is a peer-to-peer relationship between the newly added protocol layer of the radio access network device and the newly added protocol layer of the second terminal, and the newly added protocol layer of the radio access network device is mainly responsible for decapsulating the second data to obtain the identifier of the first terminal, and learning, based on the identifier of the first terminal, that the first RRC message received from the second terminal is the RRC message sent by the first terminal.

In the possible design, the second data may include the first RRC message, and may further include the identifier of the first terminal. Alternatively, the second data may include the first RRC message, and the first RRC message includes an identifier of the first terminal. When the second data includes only the first RRC message, to enable the radio access network device to learn that the first RRC message sent by the second terminal is the RRC message of the first terminal, the second data may further include an RRC message indication, and the RRC message indication may be used to indicate that a message included in the second data is an RRC message. In this way, the radio access network device delivers, according to the RRC message indication, the first RRC message in the second data to the RRC layer of the radio access network device for processing. For example, the RRC message indication may be included in the second data when the second data is processed by using the PDCP layer. Alternatively, the RRC message indication may be included in the second data when the second data is processed by using the RLC layer. Alternatively, the RRC message indication may be included in the second data when the second data is processed by using the MAC layer. Alternatively, the RRC message indication may be included in the second data when the second data is processed by using the newly added protocol layer. This is not limited. For example, for related descriptions of the newly added protocol layer, refer to the foregoing descriptions. Details are not described again. When the second data includes the first RRC message and the identifier of the first terminal, the radio access network device may determine, based on the identifier of the first terminal, that the second data includes the first RRC message of the first terminal, so as to deliver the first RRC message in the second data to the RRC layer of the radio access network device for processing. Optionally, in this case, the RRC message indication may also be included.

In another possible design, after processing the second data by using a PDCP layer, an RLC layer, a MAC layer, and a PHY layer that are in the second terminal and that are corresponding to the radio access network device, the second terminal sends the second data to the radio access network device through a signaling radio bearer (SRB) 1 between the second terminal and the radio access network device.

In this possible design, the second data may include the first RRC message, and the first RRC message includes the identifier of the first terminal. When the second data includes only the first RRC message, the second data may further include an RRC connection request indication (or an SRB 0 indication), so that after receiving the second data, the radio access network device directly sends, according to the RRC connection request indication (or the SRB 0 indication), the first RRC message to the RRC layer of the radio access network device for processing. For example, the RRC connection request indication may indicate the radio access network device to establish an RRC connection to the first terminal, that is, indicate that the message is an RRC message. The SRB 0 indication may be used to indicate that the first RRC message is an RRC message carried on an SRB 0. When the second data includes the first RRC message and the identifier of the first terminal, the radio access network device may determine, based on the identifier of the first terminal, that the second data includes the first RRC message of the first terminal, so as to deliver the first RRC message in the second data to the RRC layer of the radio access network device for processing. Optionally, in this case, the RRC message indication may also be included.

In another possible design, after processing the second data by using a PDCP layer, an RLC layer, a MAC layer, and a PHY layer that are in the second terminal and that are corresponding to the radio access network device, the second terminal sends the second data to the radio access network device through a signaling radio bearer (SRB) 1 between the second terminal and the radio access network device. In this possible design, after receiving the second data, the radio access network device determines, by reading a message type of the first RRC message, that the first RRC message belongs to an SRB 0, and directly sends the first RRC message to the RRC layer of the radio access network device for processing.

Step 404: The radio access network device receives the second data sent by the second terminal, and generates a second RRC message corresponding to the first RRC message.

For example, the second RRC message may be used to indicate whether the RRC connection between the first terminal and the radio access network device is successfully established. In this embodiment of this application, for example, the second RRC message is used to indicate that the RRC connection between the first terminal and the radio access network device is successfully established. The second RRC message may be RRC connection setup (RRC Connection Setup or RRC setup), RRC connection reestablishment (RRC connection reestablishment or RRC reestablishment), or RRC connection resume (RRC connection resume or RRC resume). The second RRC message may include an identifier of the second logical channel of the first path, and may further include a cell radio network temporary identifier (C-RNTI) configured by the radio access network device for the first terminal, a configuration of the SRB 1 between the radio access network device and the first terminal, and other information. For example, the second logical channel is a logical channel used to transmit, an RRC message sent by the first terminal to the radio access network device and an RRC message sent by the radio access network device to the first terminal, between the first terminal and the second terminal after the RRC connection is established between the first terminal and the radio access network device. There is a mapping relationship between the identifier of the second logical channel and the SRB 1 between the radio access network device and the first terminal. For example, if the second logical channel is an LCID 1, an RRC message subsequently sent by the second terminal to the first terminal by using the LCID 1 may be an RRC message sent by the radio access network device, and an RRC message sent by the first terminal to the second terminal by using the LCID 1 may be an RRC message sent to the radio access network device.

Optionally, the second RRC message may not include the configuration of the SRB 1 between the radio access network device and the first terminal. In this case, the first terminal may establish an RRC connection to the radio access network device by using an original SRB 1 configuration between the radio access network device and the first terminal or a default SRB 1 configuration. When the first RRC message includes the first request, the second RRC message may further include the cell identifier of the serving cell of the first terminal.

Specifically, if the radio access network device receives, through the DRB, the second data that is sent by the second terminal and that includes the identifier of the first terminal and the first RRC message, after receiving the second data, the radio access network device may process the received second data by using the MAC layer, the RLC layer, and the PDCP layer of the radio access network device, to obtain the identifier of the first terminal and the first RRC message, determine, based on the identifier of the first terminal, that the received first RRC message is an RRC message sent by the first terminal, and send the first RRC message to the RRC layer of the radio access network device for processing, to obtain the second RRC message. For example, in the embodiments of this application, for a process in which the first RRC message is sent to the RRC layer of the radio access network device for processing, to obtain the second RRC message, refer to the prior art. Details are not described again.

If the radio access network device receives, through the DRB, the second data that is sent by the second terminal and that includes the RRC message indication and the first RRC message, and the first RRC message includes the identifier of the first terminal, after receiving the second data, the radio access network device may process the received second data by using the MAC layer, the RLC layer, and the PDCP layer of the radio access network device, to obtain the RRC message indication, the identifier of the first terminal, and the first RRC message, determine, according to the RRC message indication, that a message received from the second terminal is an RRC message, determine, based on the identifier of the first terminal, that the RRC message is an RRC message sent by the first terminal, and send the first RRC message to the RRC layer of the radio access network device for processing, to obtain the second RRC message. In another possible case, the radio access network device receives, through the DRB, the second data that is sent by the second terminal and that includes the RRC message indication and the first RRC message, and the radio access network device learns, according to the RRC message indication or the RRC connection request indication (or the SRB 0 indication) in the second data, that the second data includes the first RRC message. Then, the radio access network device obtains the identifier of the first terminal by reading the first RRC message, and determines that the RRC message is the RRC message sent by the first terminal.

If the radio access network device receives, through the SRB 1, the second data that is sent by the second terminal and that includes the identifier of the first terminal and the first RRC message, after receiving the second data, the radio access network device may process the received second data by using the MAC layer, the RLC layer, and the PDCP layer of the radio access network device, to parse out a message type of the first RRC message, determine, based on the message type of the first RRC message, that the received message is an RRC message corresponding to an SRB 0, determine, based on the identifier of the first terminal, that the RRC message is an RRC message sent by the first terminal, and send the first RRC message to the RRC layer for processing, to obtain the second RRC message. Alternatively, the second data further includes an RRC message indication or an RRC connection request indication (or an SRB 0 indication). After receiving the second data, the radio access network device processes the received second data by using the MAC layer, the RLC layer, and the PDCP layer of the radio access network device, to obtain the RRC message indication or the RRC connection request indication (or the SRB 0 indication), the identifier of the first terminal, and the first RRC message, determines, based on the RRC message indication or the RRC connection request indication (or the SRB 0 indication) and the identifier of the first terminal, that the received message is an RRC message, and directly sends the second data to the RRC layer for processing, to obtain the second RRC message.

In this way, the radio access network device may receive the first RRC message that is sent by the remote device and that is used to request to establish an RRC connection, and generate, based on the received first RRC message, the second RRC message used to establish the RRC connection between the remote device and the radio access network device.

Further optionally, when the radio access network device generates the second RRC message, the radio access network device may further send the second RRC message to a first device through the second terminal, so that an RRC connection is established between the first device and the radio access network device. Specifically, the process is shown in FIG. 4, and may include the following steps.

Step 405: The radio access network device sends the identifier of the first terminal and the second RRC message to the second terminal through the second path.

For example, for related descriptions of the second path, the identifier of the first terminal, and the second RRC message, refer to the foregoing description. Details are not described again. For example, the radio access network device may include the identifier of the first terminal and the second RRC message to third data, and send the third data to the second terminal through the second path. For example, the third data may include a data packet header and a payload (payload), the second RRC message may be included in the payload of the third data, and the identifier of the first terminal may be included in the data packet header of the third data.

In a possible design, the radio access network device may process the third data by using a PDCP layer, an RLC layer, a MAC layer, and a PHY layer that are in the radio access network device and that are corresponding to the second terminal, and then send the third data to the second terminal through a data radio bearer DRB between the second terminal and the radio access network device. For example, the PDCP layer, the RLC layer, the MAC layer, and the PHY layer that are in the radio access network device and that are corresponding to the second terminal may be shown in FIG. 2. FIG. 2 shows the PDCP layer, the RLC layer, the MAC layer, and the PHY layer that are in the radio access network device and that are end-to-end connected to a PDCP layer 2, an RLC layer 2, a MAC layer 2, and a PHY layer 2 of the second terminal.

In another possible design, after processing the third data by using a PDCP layer, an RLC layer, a MAC layer, and a PHY layer that are in the radio access network device and that are corresponding to the second terminal, the radio access network device sends the third data to the second terminal through an SRB 1 between the radio access network device and the second terminal.

Optionally, the second RRC message included in the third data after the third data is processed by different protocol layers of the radio access network device remains unchanged, but information included in a data packet header of the third data after the third data is processed by different protocol layers may be different. For example, after the third data is processed by a newly added adaptation layer, the data packet header may include the identifier of the first terminal. After the third data is processed by the PDCP layer, the data packet header may further include a PDCP sequence number. Subsequently, after the third data is processed by the MAC layer, the data packet header may further include an LCID in addition to the identifier of the first terminal and the PDCP sequence number, so that the second terminal device forwards the second RRC message to the first terminal on the first path. Optionally, the identifier of the first terminal may be further included in a newly added adaptation layer packet header.

Optionally, the radio access network device may further include, to the third data, an indication used to indicate the second terminal to send the second RRC message to the first terminal. Optionally, the indication may be included in the newly added adaptation layer packet header or an existing PDCP/RLC/MAC/PHY layer packet header.

Step 406: The second terminal receives the third data that includes the identifier of the first terminal and the second RRC message, and sends the second RRC message to the first terminal through the first path based on the identifier of the first terminal.

Optionally, after receiving the third data, the second terminal may process the received third data by using the PHY layer 2, the MAC layer 2, the RLC layer 2, and the PDCP layer 2 of the second terminal, to obtain the identifier of the first terminal and the second RRC message, determine, based on the identifier of the first terminal, that the received second RRC message is an RRC message sent by the radio access network device to the first terminal, and send the second RRC message to the first terminal through the first path. Alternatively, the third data includes the indication used to indicate the second terminal to send the second RRC message to the first terminal. After obtaining the identifier of the first terminal and the second RRC message, the second terminal sends the second RRC message to the first terminal through the first path according to the indication. Optionally, the indication may be included in the newly added adaptation layer packet header or an existing PDCP/RLC/MAC/PHY layer packet header.

For example, that the second terminal sends the second RRC message to the first terminal through the first path may include.

The second terminal includes the received second RRC message to a payload of data, processes the data by using the PDCP layer 1, the RLC layer 1, the MAC layer 1, and the PHY layer 1 of the second terminal, and sends the data to the first terminal through the first path.

Step 407: The first terminal receives the second RRC message that is sent by the second terminal through the first path.

Optionally, when the second RRC message sent by the second terminal is included in the data, after receiving the data that includes the second RRC message, the first terminal processes the received data by using the PHY layer, the MAC layer, the RLC layer, and the PDCP layer of the first terminal, to obtain the second RRC message.

In this way, after receiving the second RRC message, the first terminal may configure the SRB 1 between the first terminal and the radio access network device based on the second RRC message. When the second RRC message does not include an SRB 1 configuration, the first terminal may configure the SRB 1 based on a previously stored SRB 1 configuration or a default SRB 1 configuration. There is a mapping relationship between the SRB 1 between the first terminal and the radio access network device and the identifier of the second logical channel, so that after subsequently receiving the data through the second logical channel, the first terminal determines, based on the mapping relationship, that the received data is an RRC message sent by the radio access network device, and sends the received RRC message to the PDCP layer that is in the first terminal and that is corresponding to the SRB 1 for processing. For example, for a process in which the first terminal configures the SRB 1 between the first terminal and the radio access network device based on the second RRC message, refer to the prior art. Details are not described again.

Optionally, to enable the second terminal to send an RRC message sent by the radio access network device to the first terminal, to the first terminal through the second logical channel, when the radio access network device sends the third data including the identifier of the first terminal and the second RRC message to the second terminal, the third data may further include the identifier of the second logical channel, or the method further includes sending, by the radio access network device, a fourth RRC message to the second terminal. For example, the fourth RRC message may be sent when the radio access network device sends the third data, or may be sent before or after the radio access network device sends the third data. The fourth RRC message may include the identifier of the second logical channel, and the radio access network device may send the fourth RRC message to the second terminal through the SRB 1 between the second terminal and the radio access network device.

In this way, the second terminal may determine, based on the identifier of the second logical channel, to send the received RRC message sent by the radio access network device to the first terminal, to the first terminal through the second logical channel. After receiving the RRC message from the second logical channel, the first terminal uploads the data to a PDCP layer that is in the first terminal and that is corresponding to the SRB 1 for processing.

For example, the radio access network device sends a third RRC message to the second terminal. For example, the third RRC message may be a signaling message, for example, an RRC reconfiguration message, sent by the radio access network device to the first terminal after the first terminal establishes an RRC connection to the radio access network device. Optionally, the radio access network device may further send the identifier of the first terminal to the second terminal while sending the third RRC message to the second terminal.

The second terminal receives the third RRC message, and sends the third RRC message to the first terminal through the second logical channel.

The first terminal receives the third RRC message that is sent by the second terminal through the second logical channel, and sends, based on the mapping relationship between the identifier of the second logical channel and the SRB 1 between the first terminal and the radio access network device, the third RRC message to the PDCP layer corresponding to the SRB 1 between the first terminal and the radio access network device for processing.

Optionally, when the second logical channel is multiplexed by an RRC message and another piece of data (or a message) that are sent by the radio access network device to the first terminal, to identify the RRC message that is sent by the radio access network device to the first terminal on the second logical channel, when the radio access network device sends the third RRC message, the method may further include sending, by the radio access network device, an indication message to the first terminal through the second terminal. For example, the indication message may be used to indicate that the third RRC message is from the radio access network device. The indication message may be included in the third data that carries the third RRC message. For example, the indication message may be included in a newly added adaptation layer/PDCP/RLC/MAC PDU, to be specific, the indication message is included in the third data, for example, included in a newly added adaptation layer PDCP/RLC/MAC header, when the third data is processed by using the newly added adaptation layer/PDCP/RLC/MAC layer. A specific location of the newly added adaptation layer is not limited in this specification. For example, the indication message may be a binary bit number 0 or 1 or another symbol. Specifically, which symbol is used to represent the first indication may be specified in a protocol in advance. This is not limited in this embodiment of this application. For example, the bit number "1" is used to indicate that the third RRC message is from the radio access network device. When the first data is processed by using the MAC layer, the second terminal may include the bit number "1" to the MAC header of the first data, and send the subsequent processed first data to the first terminal.

The first terminal receives the indication message sent by the second terminal, determines, based on the indication message, that the third RRC message received on the second logical channel is an RRC message from the radio access network device, and sends the third RRC message to the PDCP layer corresponding to the SRB 1 between the first terminal and the radio access network device for processing.

Optionally, in the method shown in FIG. 4, it may be determined, in the following Manner 1 or Manner 2, that the first RRC message is to be sent by the second terminal to the radio access network device.

Manner 1: Before the first terminal sends the first indication and the first data to the second terminal through the first path, the first terminal receives a discovery message (for example, a discovery request or a discovery response) sent by one or more terminals, and determines, based on the discovery message, that the first RRC message is to be sent by the second terminal to the radio access network device.

For example, the one or more terminals may include the second terminal, and the discovery message sent by each terminal includes any one or more pieces of information of a cell identifier of a serving cell of the terminal, a time advance (timing advance, TA) from the terminal to the radio access network device, a hop count from the terminal to the radio access network device, a group identifier of a group in which the terminal is located, quality of a transmission link between the terminal and the radio access network device, and quality of a transmission link between the terminal and the first terminal.

The cell identifier of the serving cell of the terminal may be a cell identifier of a cell serving the terminal. The cell identifier may be an ECGI, an NR CGI, or a PCI, and the cell identifier may be used to identify the serving cell of the terminal.

The TA from the terminal to the radio access network device may be a time advance of sending uplink data by the terminal to the radio access network device relative to receiving data from the radio access network device. A shorter distance to the radio access network device indicates a smaller TA from the terminal to the radio access network device. On the contrary, a longer distance to the radio access network device indicates a larger TA from the terminal to the radio access network device.

The hop count from the terminal to the radio access network device may be a quantity of relay devices through which the terminal sends data to the radio access network device. For example, if a terminal 1 sends data to the radio access network device through a terminal 2, a terminal 3, and a terminal 4, the hop count from the terminal 1 to the radio access network device is 3. A shorter distance between the terminal and the radio access network device indicates a smaller hop count from the terminal to the radio access network device. On the contrary, a longer distance between the terminal and the radio access network device indicates a larger hop count from the terminal to the radio access network device.

The identifier of the group in which the terminal is located may be used to identify a group to which the terminal belongs. For example, the first terminal may select the second terminal in a same group as the first terminal as a relay to forward the first RRC message.

The quality of the transmission link between the terminal and the radio access network device may include reference signal receiving power (reference signal receiving power, RSRP) or reference signal receiving quality (reference signal receiving quality, RSRQ) between the terminal and the radio access network device. Larger RSRP or RSRQ between the terminal and the radio access network device indicates better quality of the transmission link between the terminal and the radio access network device. On the contrary, smaller RSRP or RSRQ between the terminal and the radio access network device indicates poorer quality of the transmission link between the terminal and the radio access network device.

The quality of the transmission link between the terminal and the first terminal may include RSRP or RSRQ between the terminal and the first terminal. Larger RSRP or RSRQ between the terminal and the first terminal indicates better quality of the transmission link between the terminal and the first terminal. On the contrary, smaller RSRP or RSRQ between the terminal and the first terminal indicates poorer quality of the transmission link between the terminal and the first terminal.

Specifically, for example, the second terminal is any one of the one or more terminals. That the first terminal determines, based on the discovery message, that the first RRC message is to be sent by the terminal to the radio access network device may include the following steps.

The first terminal searches for cell identifiers of serving cells, compares the cell identifiers of the found serving cells with cell identifiers of serving cells of the one or more terminals, and selects, from the one or more terminals, a terminal whose serving cell has a cell identifier the same as the cell identifier of the serving cell of the first terminal, to send the first RRC message to the radio access network device. For example, in the embodiments of this application, for a process in which the first terminal searches for the cell identifier of the serving cell, refer to the prior art. Details are not described again.

Alternatively, the first terminal soils TAs from the one or more terminals to the radio access network device, and selects one or more terminals with smaller TAs from the one or more terminals, to send the first RRC message to the radio access network device.

Alternatively, the first terminal sorts hop counts from the one or more terminals to the radio access network device, and selects one or more terminals with relatively small TAs from the one or more terminals, to send the first RRC message to the radio access network device.

Alternatively, the first terminal compares the identifier of the group in which the first terminal is located with an identifier of a group in which the one or more terminals are located, and selects, from the one or more terminals, a terminal in a group whose identifier is the same as the identifier of the group in which the first terminal is located, to send the first RRC message to the radio access network device.

Alternatively, the first terminal soils quality of transmission links between the one or more terminals and the radio access network device, and selects one or more terminals with relatively high transmission link quality from the one or more terminals, to send the first RRC message to the radio access network device.

Alternatively, the first terminal soils quality of transmission links between the one or more terminals and the first terminal, and selects one or more terminals with relatively high transmission link quality from the one or more terminals, to send the first RRC message to the radio access network device.

Alternatively, the first terminal compares the cell identifier of the found serving cell (or an identifier of a group in which the found serving cell is located) with a cell identifier of a serving cell of the one or more terminals (or an identifier of a group in which the serving cell of the one or more terminals is located), obtains, from the one or more terminals, terminals in a serving cell whose cell identifier (or whose identifier of a group in which the serving cell of the terminals is located) is the same as the cell identifier of the found serving cell (or the identifier of the group in which the found serving cell is located), soils TAs (and/or hop counts) between the terminals and the radio access network device, and selects one or more terminals with smaller TAs (and/or hop counts), to send the first RRC message to the radio access network device.

Alternatively, the first terminal compares the cell identifier of the found serving cell (or an identifier of a group in which the found serving cell is located) with a cell identifier of a serving cell of the one or more terminals (or an identifier of a group in which the serving cell of the one or more terminals is located), obtains, from the one or more terminals, terminals in a serving cell whose cell identifier (or whose identifier of a group in which the serving cell of the terminals is located) is the same as the cell identifier of the found serving cell (or the identifier of the group in which the found serving cell is located), sorts quality of transmission links between the terminals and the radio access network device (and/or quality of transmission links between the terminals and the first terminal), and selects one or more terminals with relatively high transmission link quality, to send the first RRC message to the radio access network device.

Alternatively, the first terminal compares the cell identifier of the found serving cell (or an identifier of a group in which the found serving cell is located) with a cell identifier of a serving cell of the one or more terminals (or an identifier of a group in which the serving cell of the one or more terminals is located), obtains, from the one or more terminals, terminals in a serving cell whose cell identifier (or whose identifier of a group in which the serving cell of the terminals is located) is the same as the cell identifier of the found serving cell (or the identifier of the group in which the found serving cell is located), soils TAs (and/or hop counts) between the terminals and the radio access network device and sorts quality of transmission links between the terminals and the radio access network device (and/or quality of transmission links between the terminals and the first terminal), and selects one or more terminals with smaller TAs (and/or hop counts) and relatively high transmission link quality, to send the first RRC message to the radio access network device.

When the first terminal determines the second terminal in Manner 1, the first data may further include the identifier of the second terminal or the identifier of the group in which the second terminal is located. For example, the identifier of the second terminal or the identifier of the group in which the second terminal is located may be included in a destination address segment of a data packet header when the first data is processed by using the MAC layer of the first terminal.

Manner 2: The first data may further include any one or more pieces of information of a preset TA threshold from the terminal to the radio access network device and a preset hop count threshold from the terminal to the radio access network device.

After the second terminal receives the first data, the second terminal may determine, based on the any one or more pieces of information of the TA threshold and the hop count threshold, whether to send the first RRC message in the first data. If the second terminal determines to send the first RRC message in the first data, step 303 is performed, otherwise, step 303 is not performed, and a forwarding failure indication is sent to the first terminal. The forwarding failure indication may be used to indicate that the second terminal has not sent the first RRC message to the radio access network device.

In Manner 2, optionally, when determining to forward the first RRC message in the first data, the second terminal performs step 303 of sending a forwarding success indication to the first terminal. The forwarding success indication may be used to indicate that the second terminal has sent the first RRC message to the radio access network device. Optionally, regardless of whether the second terminal indeed forwards the first RRC message in the first data, the second terminal sends a forwarding indication to the first terminal. The forwarding indication is used to indicate whether the second terminal has sent the first RRC message to the radio access network device.

For example, the TA threshold is used to limit a maximum TA for sending uplink data by the terminal to the radio access network device. If the TA from the terminal to the radio access network device is greater than the TA threshold, it indicates that the terminal is relatively far away from the radio access network device, and is not suitable to send the first RRC message to the radio access network device, otherwise, it may be determined that the first RRC message is to be sent by the terminal to the radio access network device.

The hop count threshold is used to limit a maximum hop count from the terminal to the radio access network device. If the hop count from the terminal to the radio access network device is greater than the hop count threshold, it indicates that the terminal is relatively far away from the radio access network device, and is not suitable to send the first RRC message to the radio access network device, otherwise, it may be determined that the first RRC message is to be sent by the terminal to the radio access network device.

Specifically, that the second terminal determines, based on the any one or more pieces of information of the TA threshold and the hop count threshold, whether to send the first RRC message in the first data may include the second terminal compares the TA from the second terminal to the radio access network device with the TA threshold, and if the TA from the second terminal to the radio access network device is less than or equal to the TA threshold, the second terminal determines to send the first RRC message in the first data, and/or the second terminal compares the hop count from the second terminal to the radio access network device with the hop count threshold, and if the hop count from the second terminal to the radio access network device is less than or equal to the hop count threshold, the second terminal determines to send the first RRC message in the first data.

Based on the method shown in FIG. 4, the first terminal may send the first RRC message to the radio access network device through the second terminal. After receiving the first RRC message, the radio access network device generates the second RRC message, and sends the second RRC message to the first terminal through the second terminal, so that the first terminal establishes an RRC connection between the first terminal and the radio access network device based on the received second RRC message.

FIG. 4 is described by using an example in which a wireless communications interface is established between the second terminal and the radio access network device. When no wireless communications interface is established between the second terminal and the radio access network device, the second terminal may send the first RRC message to the radio access network device through another relay device that establishes a wireless communications interface with the radio access network device. Specifically, the method is shown in FIG. 5, and may include the following steps.

Step 501: A first terminal generates a first RRC message.

Step 501 is the same as step 401. Details are not described again.

Step 502: The first terminal sends a first indication and first data to a second terminal through the first path.

Step 502 is the same as step 402. Details are not described again.

Step 503: The second terminal receives the first indication and the first data that are sent by the first terminal through the first path, and sends second data to a third terminal according to the first indication.

For example, the third terminal may be any terminal that establishes a wireless communications interface with the second terminal. Specifically, it may be determined, in the foregoing Manner 1 or Manner 2, that the first RRC message is to be sent by the third terminal to the radio access network device.

For example, in addition to an identifier of the first terminal and the first RRC message (or only the first RRC message), the second data may further include a second indication. The second indication may be used to indicate the third terminal to send the first RRC message to the radio access network device. For a representation form of the second indication, refer to the first indication. The second indication may be a preset identifier of a logical channel between the second terminal and the third terminal, or may be an indication in a newly added adaptation layer PDU, a PDCP PDU, an RLC PDU, or a MAC PDU of the second terminal, or may be an indication included in SCI that is sent by the second terminal to the third terminal. Details are not described again.

Step 504: The third terminal receives the second indication and the second data that are sent by the second terminal, and sends the second data to the radio access network device according to the second indication.

For example, a radio interface channel, namely, a second channel, is established between the third terminal and the radio access network device. A process in which the third terminal sends the second data to the radio access network device is the same as the process in which the second terminal sends the second data to the radio access network device in the method shown in FIG. 4. Details are not described again.

Optionally, the second data sent by the third terminal to the radio access network device may include an identifier of the second terminal, for example, an identifier of the second terminal on a PC5 interface or a sidelink sidelink, so that when subsequently sending a second RRC message, the radio access network device sends the second RRC message to the first terminal through the second terminal.

Step 505: The radio access network device receives the second data sent by the third terminal, and generates the second RRC message corresponding to the first RRC message.

For step 505, refer to the description of step 504. Details are not described again.

In this way, the radio access network device may receive, through the second terminal and the third terminal, the first RRC message that is sent by the first terminal and that is used to request to establish an RRC connection, and generate, based on the received first RRC message, the second RRC message used to establish the RRC connection between the remote device (that is, the first terminal) and the radio network device.

Further, optionally, as shown in FIG. 5, the method may further include the following steps.

Step 506: The radio access network device sends the identifier of the first terminal and the second RRC message to the third terminal.

For example, the identifier of the first terminal and the second RRC message may be included in third data. The third data is shown in FIG. 4. For a manner in which the radio access network device sends the third data to the third terminal, refer to the manner in which the radio access network device sends the third data to the second terminal in FIG. 4. Details are not described again.

Optionally, to enable that the second RRC message is to be sent to the first terminal through the second terminal, the radio access network device may further send the identifier of the second terminal to the third terminal while sending the identifier of the first terminal and the second RRC message to the third terminal. For example, the identifier of the second terminal may be included in the third data that is sent by the radio access network device to the third terminal. Particularly, the identifier of the first terminal may be an identifier of the first terminal on the PC5 interface or the sidelink sidelink, and the identifier of the second terminal may be an identifier of the second terminal on the PC5 interface or the sidelink sidelink.

Step 507: The third terminal receives the identifier of the first terminal and the second RRC message, and sends an indication of the first terminal and the second RRC message to the second terminal.

Step 508: The second terminal receives the indication of the first terminal and the second RRC message, and sends the second RRC message to the first terminal according to the indication of the first terminal.

Step 509: The first terminal receives the second RRC message sent by the second terminal.

After receiving the second RRC message, the first terminal may configure an SRB 1 between the first terminal and the radio access network device based on the second RRC message. When the second RRC message does not include an SRB 1 configuration, the first terminal may configure the SRB 1 based on a previously stored SRB 1 configuration or a default SRB 1 configuration. There is a mapping relationship between the SRB 1 between the first terminal and the radio access network device and an identifier of a second logical channel, so that after subsequently receiving data through the second logical channel, the first terminal determines, based on the mapping relationship, that a received RRC message is an RRC message sent by the radio access network device, and sends the received RRC message to a PDCP layer corresponding to the SRB 1 for processing.

Optionally, to enable the second terminal to send an RRC message sent by the radio access network device to the first terminal, to the first terminal through the second logical channel, when the radio access network device sends the third data including the identifier of the first terminal and the second RRC message to the third terminal, the third data may further include the identifier of the second logical channel, or the method further includes sending, by the radio access network device, a fourth RRC message to the second terminal through the third terminal. For example, the fourth RRC message may be sent when the radio access network device sends the third data, or may be sent before or after the radio access network device sends the third data. The fourth RRC message may include the identifier of the second logical channel.

In this way, the second terminal may determine, based on the identifier of the second logical channel, to send the received RRC message sent by the radio access network device to the first terminal, to the first terminal through the second logical channel. After receiving the RRC message from the second logical channel, the first terminal uploads the RRC message to the PDCP layer corresponding to the SRB 1 for processing.

For example, the radio access network device sends a third RRC message to the second terminal through the third terminal. The second terminal receives the third RRC message, and sends the third RRC message to the first terminal through the second logical channel. The first terminal receives the third RRC message that is sent by the second terminal through the second logical channel, and sends, based on the mapping relationship between the identifier of the second logical channel and the SRB 1 between the first terminal and the radio access network device, the third RRC message to the PDCP layer corresponding to the SRB 1 between the first terminal and the radio access network device for processing. The third RRC message is described above. Details are not described again.

Optionally, when the second logical channel is multiplexed by an RRC message and another piece of data (or a message) that are sent by the radio access network device to the first terminal, to identify the RRC message that is sent by the radio access network device to the first terminal on the second logical channel, when the radio access network device sends the third RRC message, the method may further include sending, by the radio access network device, an indication message to the first terminal through the third terminal and the second terminal. For example, the indication message may be used to indicate that the third RRC message is from the radio access network device. The first terminal receives the indication message, determines, based on the indication message, that the third RRC message received on the second logical channel is an RRC message from the radio access network device, and sends the third RRC message to the PDCP layer corresponding to the SRB 1 between the first terminal and the radio access network device for processing. Optionally, the indication message may be carried in a data packet header when the third terminal or the second terminal sends the third RRC message on the PC5 interface or the sidelink.

Optionally, in the method shown in FIG. 5, it may be determined, in the following Manner 1 or Manner 2, that the first RRC message is to be sent by the second terminal to the radio access network device.

Optionally, in the method shown in FIG. 5, that the second terminal sends the first RRC message to the radio access network device through only one relay device is described. Similarly, the second terminal may alternatively send the first RRC message to the radio access network device through a plurality of hops, for example, through a plurality of relay devices such as the third terminal and a fourth terminal. When the second terminal sends the first RRC message to the radio access network device through a plurality of hops, for a process of forwarding the first RRC message between the plurality of hops, refer to the process in which the second terminal sends the first RRC message to the third terminal. Details are not described again.

Based on the method shown in FIG. 5, the first terminal may send the first RRC message to the radio access network device through the second terminal and the third terminal. After receiving the first RRC message, the radio access network device generates the second RRC message, and sends the second RRC message to the first terminal through the third terminal and the second terminal, so that the first terminal establishes an RRC connection between the first terminal and the radio access network device based on the received second RRC message.

The foregoing mainly describes the solutions provided in the embodiments of this application from a perspective of interaction between the network elements. It may be understood that, to implement the foregoing functions, the first terminal, the second terminal, and the radio access network device include corresponding hardware structures and/or software modules for performing the functions. A person skilled in the art should be easily aware that, in combination with the examples of units and algorithm steps described in the embodiments disclosed in this specification, this application can be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

In the embodiments of this application, the first terminal, the second terminal, and the radio access network device may be divided into functional modules based on the foregoing method examples. For example, each functional module may be obtained through division based on each corresponding function, or two or more functions may be integrated into one processing module. The integrated module may be implemented in a form of hardware, or may be implemented in a form of a software functional module. Optionally, in the embodiments of this application, module division is used as an example, and is merely logical function division. In actual implementation, another division manner may be used.

Figure 6:
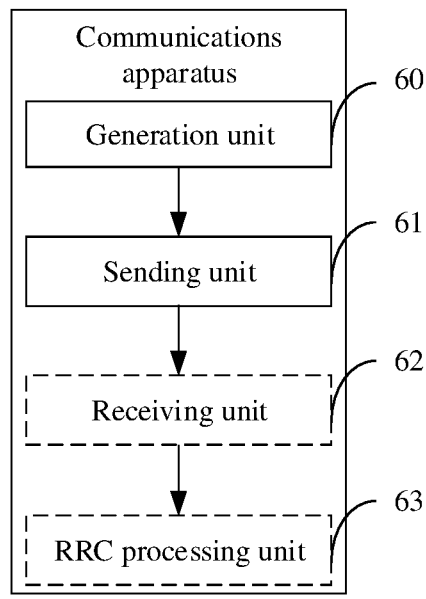
FIG. 6 is a schematic composition diagram of another communications apparatus according to an embodiment of this application.

FIG. 6 is a schematic composition diagram of a communications apparatus. The communications apparatus may be a first terminal, or a chip or a system-on-a-chip in the first terminal. The communications apparatus may be configured to perform a function of the first terminal in the foregoing embodiments. In an implementable manner, the communications apparatus shown in FIG. 6 includes a generation unit 60 and a sending unit 61.

The generation unit 60 is configured to generate a first RRC message. For example, the generation unit 60 may be configured to support the communications apparatus in performing step 401 and step 501.

The sending unit 61 is configured to send a first indication and first data to a second terminal through a wireless communications interface between the first terminal and the second terminal, where the first indication is used to indicate the second terminal to send the first RRC message to a radio access network device. For example, the sending unit 61 may be configured to support the communications apparatus in performing step 402 and step 502.

Further, optionally, as shown in FIG. 6, the communications apparatus may further include a receiving unit 62, configured to receive a second RRC message that is sent by the second terminal through the first path and that includes an identifier of a second logical channel of the first path. For example, the receiving unit 62 may be configured to support the communications apparatus in performing step 406 and step 508.

For example, the second RRC message is from the radio access network device, there is a mapping relationship between the identifier of the second logical channel and an SRB 1 of the first terminal, and the SRB 1 of the first terminal is a signaling radio bearer between the first terminal and the radio access network device.

The receiving unit 62 is further configured to receive a third RRC message that is sent by the second terminal through the second logical channel.

An RRC processing unit 63 is configured to send, based on the mapping relationship between the identifier of the second logical channel and the SRB 1, the third RRC message to a PDCP layer corresponding to the SRB 1 for processing.

Optionally, all related content of the steps in the foregoing method embodiments may be cited in function descriptions of corresponding functional modules. Details are not described herein again. The communications apparatus provided in this embodiment of this application is configured to perform the function of the first terminal in the foregoing RRC connection methods, and therefore can achieve a same effect as the foregoing RRC connection methods.

In another implementable manner, the communications apparatus shown in FIG. 6 may include a processing module and a communications module. The generation unit 60 and the RRC processing unit 63 are integrated into the processing module, and the sending unit 61 and the receiving unit 62 are integrated into the communications module. The processing module is configured to control and manage an action of the communications apparatus. For example, the processing module is configured to support the communications apparatus in performing step 401, step 501, and another process of the technology described in this specification. The communications module is configured to support the communications apparatus in performing step 402, step 502, step 406, and step 508, and communicating with another network entity, for example, communicating with the relay device shown in FIG. 1 or the another network entity through a first path. Further, the communications apparatus may further include a storage module, configured to store program code and data of the communications apparatus.

For example, the processing module may be a processor or a controller. The processor or the controller may implement or execute various example logical blocks, modules, and circuits described with reference to content disclosed in this application. Alternatively, the processor may be a combination of processors implementing a computing function, for example, a combination of one or more microprocessors, or a combination of a DSP and a microprocessor. The communications module may be a transceiver circuit, a communications interface, or the like. The storage module may be a memory. When the processing module is a processor, the communications module is a communications interface, and the storage module is a memory, the communications apparatus shown in FIG. 6 may be the communications apparatus shown in FIG. 3.

Figure 7:
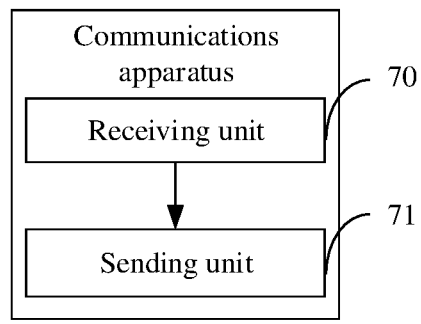
FIG. 7 is a schematic composition diagram of another communications apparatus according to an embodiment of this application.

FIG. 7 is a schematic composition diagram of a communications apparatus. The communications apparatus may be a second terminal, or a chip or a system-on-a-chip in the second terminal. The communications apparatus may be configured to perform a function of the second terminal in the foregoing embodiments. In an implementable manner, the communications apparatus shown in FIG. 7 includes a receiving unit 70 and a sending unit 71.

The receiving unit 70 is configured to receive a first indication and first data that are sent by a first terminal through a first path, where the first data includes a first RRC message, and the first indication is used to indicate the second terminal to send the first RRC message to a radio access network device. For example, the receiving unit 70 is configured to support the communications apparatus in performing the receiving action in step 403 and step 503.

The sending unit 71 is configured to send second data according to the first indication. For example, the second data includes an identifier of the first terminal and the first RRC message. For example, the sending unit 71 is configured to support the communications apparatus in performing the sending action in step 403 and step 503.

Further, the receiving unit 70 is further configured to receive third data. For example, the third data includes the identifier of the first terminal and a second RRC message, where the second RRC message includes an identifier of a second logical channel of the first path. For example, the receiving unit 70 is further configured to support the communications apparatus in performing the receiving action in step 406 and step 508.

The sending unit 71 is further configured to send the second RRC message to the first terminal through the first path based on the identifier of the first terminal. For example, the sending unit 71 is further configured to support the communications apparatus in performing the sending action in step 406 and step 508.

Optionally, all related content of the steps in the foregoing method embodiments may be cited in function descriptions of corresponding functional modules. Details are not described herein again. The communications apparatus provided in this embodiment of this application is configured to perform the function of the second terminal in the foregoing RRC connection methods, and therefore can achieve a same effect as the foregoing RRC connection methods.

In another implementable manner, the communications apparatus shown in FIG. 7 may include a processing module and a communications module. The receiving unit 70 and the sending unit 71 may be integrated into the communications module. The processing module is configured to control and manage an action of the communications apparatus. The communications module is configured to support the communications apparatus in performing step 403, step 503, step 406, and step 508, and communicating with another network entity, for example, communicating with the remote device or the radio access network device shown in FIG. 1, or the another network entity. Further, the communications apparatus may further include a storage module, configured to store program code and data of the communications apparatus.

For example, the processing module may be a processor or a controller. The processor or the controller may implement or execute various example logical blocks, modules, and circuits described with reference to content disclosed in this application. Alternatively, the processor may be a combination of processors implementing a computing function, for example, a combination of one or more microprocessors, or a combination of a DSP and a microprocessor. The communications module may be a transceiver circuit, a communications interface, or the like. The storage module may be a memory. When the processing module is a processor, the communications module is a communications interface, and the storage module is a memory, the communications apparatus shown in FIG. 7 may be the communications apparatus shown in FIG. 3.

Figure 8:
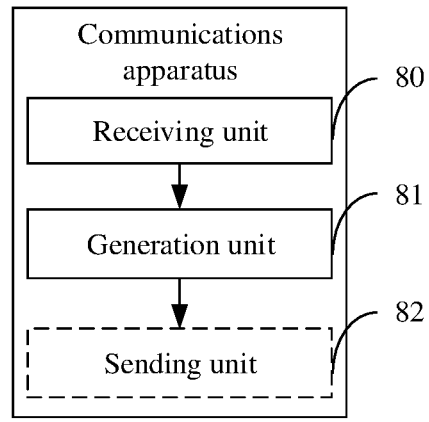
FIG. 8 is a schematic composition diagram of still another communications apparatus according to an embodiment of this application.

FIG. 8 is a schematic composition diagram of a communications apparatus. The communications apparatus may be a radio access network device, or a chip or a system-on-a- chip in the radio access network device. The communications apparatus may be configured to perform a function of the radio access network device in the foregoing embodiments. In an implementable manner, the communications apparatus shown in FIG. 8 includes a receiving unit 80 and a generation unit 81.

The receiving unit 80 is configured to receive, from a wireless communications interface between the radio access network device and a second terminal, second data sent by the second terminal, where the second data includes an identifier of a first terminal and a first RRC message. For example, the receiving unit 80 may support the communications apparatus in performing the receiving action in step 404 and step 505.

The generation unit 81 is configured to generate a second RRC message corresponding to the first RRC message. For example, the generation unit 81 may be configured to support the communications apparatus in performing the action of generating the RRC message in step 404 and step 505.

Further, as shown in FIG. 8, the communications apparatus may further include a sending unit 82, configured to send the identifier of the first terminal and the second RRC message to the second terminal through the second path. For example, the second RRC message includes an identifier of a second logical channel of a first path. For example, the sending unit 82 may be configured to support the communications apparatus in performing step 405 and step 506.

It should be noted that all related content of the steps in the foregoing method embodiments may be cited in function descriptions of corresponding functional modules. Details are not described again herein. The communications apparatus provided in this embodiment of this application is configured to perform the function of the radio access network device in the foregoing RRC connection methods, and therefore can achieve a same effect as the foregoing RRC connection methods.

In another implementable manner, the communications apparatus shown in FIG. 8 may include a processing module and a communications module. The processing module is integrated with a generation unit 81, and the communications module is integrated with a receiving unit 80 and a sending unit 82. The processing module is configured to control and manage an action of the communications apparatus. For example, the processing module is configured to support the communications apparatus in performing the action of generating the RRC message in step 404 and step 505, and performing another process of the technology described in this specification. The communications module is configured to support the communications apparatus in performing the receiving action in step 404 and step 505, step 405 and step 506, and communicating with another network entity, for example, communicating with a functional module or a network entity shown in FIG. 1. Further, the communications apparatus may further include a storage module, configured to store program code and data of the communications apparatus.

For example, the processing module may be a processor or a controller. The processor or the controller may implement or execute various example logical blocks, modules, and circuits described with reference to content disclosed in this application. Alternatively, the processor may be a combination of processors implementing a computing function, for example, a combination of one or more microprocessors, or a combination of a DSP and a microprocessor. The communications module may be a transceiver circuit, a communications interface, or the like. The storage module may be a memory. When the processing module is a processor, the communications module is a communications interface, and the storage module is a memory, the communications apparatus shown in FIG. 8 may be the communications apparatus shown in FIG. 3.

Figure 9:
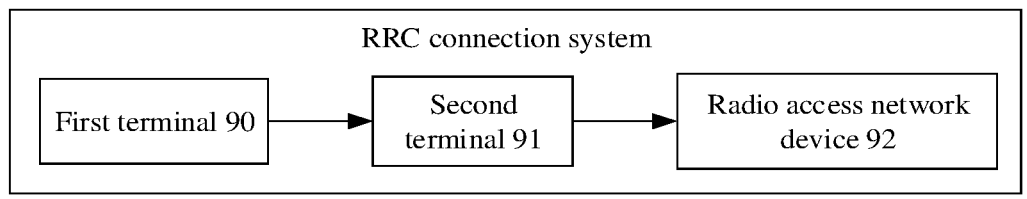
FIG. 9 is a schematic composition diagram of an RRC connection system according to an embodiment of this application.

FIG. 9 is a schematic composition diagram of an RRC connection system. As shown in FIG. 9, the RRC connection system may include a first terminal 90, a second terminal 91, and a radio access network device 92. A first path is established between the first terminal 90 and the second terminal 91, and the first terminal 90 and the second terminal 91 may communicate with each other through the first path. A second path is established between the second terminal 91 and the radio access network device 92, and the second terminal 91 and the radio access network device 92 may communicate with each other through the second path.

For example, the first terminal 90 has a function of the communications apparatus shown in FIG. 6, and may be configured to generate a first RRC message, send a first indication and first data to the second terminal 91 through a wireless communications interface between the first terminal 90 and the second terminal 91, and the first indication is used to indicate the second terminal 91 to send the first RRC message to the radio access network device 92.

The second terminal 91 has a function of the communications apparatus shown in FIG. 7, and may be configured to receive a first indication and first data that are sent by the first terminal 90 through the first path, where the first data includes a first RRC message, and the first indication is used to indicate the second terminal 91 to send the first RRC message to the radio access network device 92, and send second data according to the first indication. For example, the second data includes an identifier of the first terminal 90 and the first RRC message.

The radio access network device 92 has a function of the communications apparatus shown in FIG. 8, and may be configured to receive, from a wireless communications interface between the radio access network device 92 and the second terminal 91, second data sent by the second terminal 91, where the second data includes an identifier of the first terminal 90 and a first RRC message, and generate a second RRC message corresponding to the first RRC message.

Further, the radio access network device 92 may be further configured to send the identifier of the first terminal 90 and the second RRC message to the second terminal 91 through the second path. For example, the second RRC message includes an identifier of a second logical channel of a first path.

The second terminal 91 may be further configured to receive third data. For example, the third data includes the identifier of the first terminal 90 and a second RRC message, and the second RRC message includes an identifier of a second logical channel of the first path, and send the second RRC message to the first terminal 90 through the first path based on the identifier of the first terminal 90.

The first terminal 90 may be further configured to receive the second RRC message that is sent by the second terminal 91 through the first path and that includes the identifier of the second logical channel of the first path.

For example, the second RRC message is from the radio access network device 92, there is a mapping relationship between the identifier of the second logical channel and an SRB 1 of the first terminal 90, and the SRB 1 of the first terminal 90 is a signaling radio bearer between the first terminal 90 and the radio access network device 92.

The first terminal 90 may be further configured to receive a third RRC message sent by the second terminal 91 through the second logical channel, and send, based on the mapping relationship between the identifier of the second logical channel and the SRB 1, the third RRC message to a PDCP layer corresponding to the SRB 1 for processing.

It should be noted that all related content of the steps in the foregoing method embodiments may be cited in function descriptions of corresponding network elements of the RRC connection system. Details are not described herein again. The RRC connection provided in this embodiment of this application is used to perform the foregoing RRC connection methods, and therefore can achieve a same effect as the foregoing RRC connection methods. For example, the first terminal 90 may send an RRC message to the radio access network device 92 through the second terminal 91, so that the radio access network device 92 implements an RRC connection to the first terminal 90 based on the received RRC message.

Figure 10:
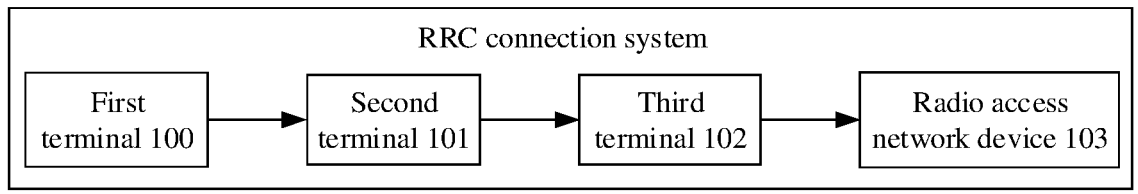
FIG. 10 is a schematic composition diagram of another RRC connection system according to an embodiment of this application.

FIG. 10 is a schematic composition diagram of an RRC connection system. As shown in FIG. 10, the RRC connection system may include a first terminal 100, a second terminal 101, a third terminal 102, and a radio access network device 103. A first path is established between the first terminal 100 and the second terminal 101, and the first terminal 100 and the second terminal 101 may communicate with each other through the first path. A wireless communications interface is established between the second terminal 101 and the third terminal 102, a wireless communications interface is established between the third terminal 102 and the radio access network device 103, and the second terminal 101 and the radio access network device 103 may communicate with each other through the wireless communications interface.

For example, the first terminal 100 has a function of the communications apparatus shown in FIG. 6, and may be configured to generate a first RRC message, send a first indication and first data to the second terminal 101 through a wireless communications interface between the first terminal 100 and the second terminal 101, and the first indication is used to indicate the second terminal 101 to send the first RRC message to the radio access network device 103.

The second terminal 101 has a function of the communications apparatus shown in FIG. 7, and may be configured to receive a first indication and first data that are sent by the first terminal 100 through the first path, where the first data includes a first RRC message, and the first indication is used to indicate the second terminal 101 to send the first RRC message to the radio access network device 103, and send second data according to the first indication. For example, the second data includes an identifier of the first terminal 100 and the first RRC message.

The radio access network device 103 has a function of the communications apparatus shown in FIG. 8, and may be configured to receive, from a wireless communications interface between the radio access network device 103 and the third terminal 102, second data sent by the third terminal 102, where the second data includes an identifier of the first terminal 100 and a first RRC message, and generate a second RRC message corresponding to the first RRC message.

Further, the radio access network device 103 may be further configured to send the identifier of the first terminal 100 and the second RRC message to the third terminal 102. For example, the second RRC message includes an identifier of a second logical channel of the first path.

The third terminal 102 may be further configured to receive third data. For example, the third data includes the identifier of the first terminal 100 and a second RRC message, and the second RRC message includes an identifier of a second logical channel of the first path, and send the third data to the second terminal 101 based on the identifier of the first terminal 100 through the wireless communications interface between the third terminal 102 and the second terminal 101.

The second terminal 101 may be further configured to receive the third data, and send the second RRC message to the first terminal 100 through the first path based on the identifier of the first terminal 100.

The first terminal 100 may be further configured to receive the second RRC message that is sent by the second terminal 101 through the first path and that includes the identifier of the second logical channel of the first path.

For example, the second RRC message is from the radio access network device 103, there is a mapping relationship between the identifier of the second logical channel and an SRB 1 of the first terminal 100, and the SRB 1 of the first terminal 100 is a signaling radio bearer between the first terminal 100 and the radio access network device 103.

The first terminal 100 may be further configured to receive a third RRC message sent by the second terminal 101 through the second logical channel, and send, based on the mapping relationship between the identifier of the second logical channel and the SRB 1, the third RRC message to a PDCP layer corresponding to the SRB 1 for processing.

It should be noted that all related content of the steps in the foregoing method embodiments may be cited in function descriptions of corresponding network elements of the RRC connection system. Details are not described herein again. The RRC connection provided in this embodiment of this application is used to perform the foregoing RRC connection method, and therefore can achieve a same effect as the foregoing RRC connection method. For example, the first terminal 100 may send an RRC message to the radio access network device 103 through the second terminal 101 and the third terminal 102, so that the radio access network device 103 implements an RRC connection to the first terminal 100 based on the received RRC message.

It may be understood that the first terminal may not only send the RRC message to the radio access network device 103 through the second terminal and the third terminal, but also send the RRC message to the radio access network device through relay devices of more than two hops. When the first terminal sends the RRC message to the radio access network device through the relay devices of more than two hops, for a specific sending process of the first terminal, refer to the methods provided in the embodiments of this application. Details are not described again.

All or some of the foregoing embodiments may be implemented by using software, hardware, firmware, or any combination thereof. When a software program is used to implement the embodiments, the embodiments may be implemented completely or partially in a form of a computer program product. The computer program product includes one or more computer instructions. When the computer program instructions are loaded and executed on a computer, the procedure or functions according to the embodiments of this application are all or partially generated. The computer may be a general purpose computer, a dedicated computer, a computer network, or another programmable apparatus. The computer instructions may be stored in a computer-readable storage medium, or may be transmitted from one computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (digital subscriber line, DSL)) or wireless (for example, infrared, wireless, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (solid state disk, SSD)), or the like.

Although this application is described with reference to the embodiments, in a process of implementing this application that claims protection, a person skilled in the art may understand and implement another variation of the disclosed embodiments by viewing the accompanying drawings, disclosed content, and the accompanying claims. In the claims, the word "comprising" (comprising) does not exclude another component or another step, and "a" or "one" does not exclude a case of plurality. A single processor or another unit may implement several functions enumerated in the claims. Some measures are recorded in dependent claims that are different from each other, but this does not mean that these measures cannot be combined to produce a better effect.

Although this application is described with reference to specific features and the embodiments thereof, it is clear that various modifications and combinations may be made to them without departing from the spirit and scope of this application. Correspondingly, the specification and accompanying drawings are merely example description of this application defined by the accompanying claims, and are considered as any of or all modifications, variations, combinations or equivalents that cover the scope of this application. It is clear that, a person skilled in the art can make various modifications and variations to this application without departing from the spirit and scope of this application. This application is intended to cover these modifications and variations of this application provided that they fall within the scope of the claims of this application and their equivalent technologies.

What is claimed is:

1. A radio resource control (RRC) connection method, wherein the method comprises:
   generating, by a first terminal, a first RRC message;
   sending, by the first terminal, a first indication and first data to a second terminal through a first path, wherein the first path has a first logical channel and a second logical channel and is a wireless communications interface between the first terminal and the second terminal, wherein the first data comprises the first RRC message, and wherein the first indication indicates to the second terminal to send the first RRC message to a radio access network device;
   receiving, by the first terminal, a second RRC message that is from the radio access network device and that has an identifier of the second logical channel of the first path, wherein a mapping relationship exists between the identifier of the second logical channel and a signaling radio bearer (SRB) 1 of the first terminal, and wherein the SRB 1 of the first terminal is a signaling radio bearer between the first terminal and the radio access network device;
   configuring the SRB 1 between the first terminal and the radio access network device based on the second RRC message;
   receiving, by the first terminal, a third RRC message sent by the second terminal through the second logical channel; and
   sending, by the first terminal based on the mapping relationship between the identifier of the second logical channel and the SRB 1, the third RRC message to a packet data convergence protocol (PDCP) layer corresponding to the SRB 1 for processing.

2. The method according to claim 1, wherein the first indication is comprised in the first data, and the first indication is an identifier of the first logical channel of the first path; or
   wherein the first data is a packet data convergence protocol (PDCP) protocol data unit (PDU), and the first indication is comprised in the PDCP PDU; or
   wherein the first data is a radio link control (RLC) PDU, and the first indication is comprised in the RLC PDU; or
   wherein the first data is a media access control (MAC) PDU, and the first indication is comprised in the MAC PDU; or
   wherein the first indication is comprised in sidelink control information (SCI), and the SCI is sent to the second terminal before the first terminal sends the first data to the second terminal, wherein the first indication is transmitted on a physical sidelink control channel (PSCCH), and the first data is transmitted on a physical sidelink shared channel (PSSCH), and wherein a time domain resource occupied by the PSCCH is different from a time domain resource occupied by the PSSCH, or a frequency domain resource occupied by the PSCCH is different from a frequency domain resource occupied by the PSSCH, or a frequency domain resource occupied by the PSCCH is different from a frequency domain resource occupied by the PSSCH and a time domain resource occupied by the PSCCH is different from a frequency domain resource occupied by the PSSCH.

3. The method according to claim 1, further comprising:
   receiving, by the first terminal, a discovery message sent by one or more terminals, wherein the one or more terminals comprise the second terminal, and wherein the discovery message sent by each terminal comprises one or more pieces of information of a cell identifier of a serving cell that is of the terminal and that is in the radio access network device, a time advance (TA) from the terminal to the radio access network device, a hop count from the terminal to the radio access network device, a group identifier of a group in which the terminal is located, a quality of a transmission link between the terminal and the radio access network device, or quality of a transmission link between the terminal and the first terminal; and
   determining, by the first terminal based on the discovery message, that the first RRC message is to be forwarded by the second terminal, wherein the first data further comprises an identifier of at least one of the second terminal or a group in which the second terminal is located.

4. The method according to claim 1, wherein the first data further comprises one or more pieces of information of a preset time advance (TA) threshold from the terminal to the radio access network device or a preset hop count threshold from the terminal to the radio access network device; and wherein the one or more pieces of information of the TA threshold and the hop count threshold are used by the second terminal to determine to send the first RRC message.

5. The method according to claim 1, wherein the second RRC message is sent by the radio access network device through the second terminal on the first path.

6. The method according to claim 5, further comprising:
receiving, by the first terminal, an indication message sent by the second terminal, wherein the indication message indicates that the third RRC message is from the radio access network device.

7. The method according to claim 6, wherein the first RRC message comprises a first request, and wherein the first request requests that the radio access network device include a cell identifier of a serving cell of the first terminal in the second RRC message; and
wherein the second RRC message comprises the cell identifier of the serving cell of the first terminal.

8. A communications apparatus, comprising:
one or more processors; and
one or more non-transitory computer readable memories coupled to the one or more processors and storing computer program code for execution by the one or more processors, the program having instructions for:
generating a first radio resource control (RRC) message;
sending a first indication and first data to a second terminal through a first path having a first logical channel and a second logical channel, wherein the first path is a wireless communications interface between a first terminal and the second terminal, wherein the first data comprises the first RRC message, and wherein the first indication indicates to the second terminal to send the first RRC message to a radio access network device;
receiving a second RRC message that is from the radio access network device and that has an identifier of the second logical channel of the first path, wherein a mapping relationship exists between the identifier of the second logical channel and a signaling radio bearer (SRB) 1 of the first terminal, and wherein the SRB 1 of the first terminal is a signaling radio bearer between the first terminal and the radio access network device;
configuring the SRB 1 between the first terminal and the radio access network device based on the second RRC message;
receiving a third RRC message sent by the second terminal through the second logical channel; and
sending, based on the mapping relationship between the identifier of the second logical channel and the SRB 1, the third RRC message to a packet data convergence protocol (PDCP) layer corresponding to the SRB 1 for processing.

9. The communications apparatus according to claim 8, wherein the first indication is comprised in the first data, and the first indication is an identifier of the first logical channel of the first path; or
wherein the first data is a packet data convergence protocol (PDCP) protocol data unit (PDU), and the first indication is comprised in the PDCP PDU; or
wherein the first data is a radio link control (RLC) PDU, and the first indication is comprised in the RLC PDU; or wherein the first data is a media access control (MAC) PDU, and the first indication is comprised in the MAC PDU; or
wherein the first indication is comprised in sidelink control information (SCI), and the SCI is sent to the second terminal before the first terminal sends the first data to the second terminal, wherein the first indication is transmitted on a physical sidelink control channel (PSCCH), wherein the first data is transmitted on a physical sidelink shared channel (PSSCH), and wherein a time domain resource occupied by the PSCCH is different from a time domain resource occupied by the PSSCH, or a frequency domain resource occupied by the PSCCH is different from a frequency domain resource occupied by the PSSCH, or a frequency domain resource occupied by the PSCCH is different from a frequency domain resource occupied by the PSSCH and a time domain resource occupied by the PSCCH is different from a frequency domain resource occupied by the PSSCH.

10. The communications apparatus according to claim 8, wherein the program further includes instructions for:
receiving a discovery message sent by one or more terminals, wherein the one or more terminals comprise the second terminal, and wherein the discovery message sent by each terminal comprises one or more pieces of information of a cell identifier of a serving cell that is of the terminal and that is in the radio access network device, a time advance (TA) from the terminal to the radio access network device, a hop count from the terminal to the radio access network device, a group identifier of a group in which the terminal is located, quality of a transmission link between the terminal and the radio access network device, or quality of a transmission link between the terminal and the first terminal; and
determining, based on the discovery message, that the first RRC message is to be forwarded by the second terminal, wherein the first data further comprises an identifier of at least one of the second terminal or a group in which the second terminal is located.

11. The communications apparatus according to claim 8, wherein the first data further comprises one or more pieces of information of a preset time advance (TA) threshold from the terminal to the radio access network device and a preset hop count threshold from the terminal to the radio access network device; and
wherein the one or more pieces of information of the TA threshold and the hop count threshold are used by the second terminal to determine to send the first RRC message.

12. The communications apparatus according to claim 8, wherein the second RRC message is sent by the radio access network device through the second terminal on the first path.

13. The communications apparatus according to claim 12, wherein the program further includes instructions for:
receiving an indication message sent by the second terminal, wherein the indication message indicates that the third RRC message is from the radio access network device.

14. The communications apparatus according to claim 13, wherein the first RRC message comprises a first request, and wherein the first request requests that the radio access network device include a cell identifier of a serving cell of the first terminal in the second RRC message; and
wherein the second RRC message comprises the cell identifier of the serving cell of the first terminal.

15. A communications apparatus of a radio access network device, comprising:
one or more processors; and
one or more memories coupled to the one or more processors and storing computer program code for execution by the one or more processors, the computer program code having instructions for:
receiving, from a second path, second data sent by a second terminal, wherein the second path is a wireless communications interface between the radio access network device and the second terminal, and wherein the second data comprises an identifier of a first terminal and a first radio resource control (RRC) message; and
generating a second RRC message corresponding to the first RRC message and having an identifier of a second logical channel of a first path that has a first logical channel and the second logical channel and that is a wireless communications interface between the first terminal and the second terminal, wherein a mapping relationship exists between the identifier of the second logical channel and a signaling radio bearer (SRB) 1 of the first terminal, and wherein the SRB 1 of the first terminal is a signaling radio bearer between the first terminal and the radio access network device;
sending the second RRC message to the second terminal, the second RRC message causing the second terminal to send the second RRC message to the first terminal, wherein the second RRC message causes the first terminal to configure the SRB 1 between the first terminal and the radio access network device based on the second RRC message; and
receiving a third RRC message to the second terminal through the second logical channel, the third RRC message being sent to the second terminal causing the second terminal to send the third RRC message to the first terminal and further causing the first terminal to send, based on the mapping relationship between the identifier of the second logical channel and the SRB 1, the third RRC message to a packet data convergence protocol (PDCP) layer corresponding to the SRB 1 for processing.

16. The communications apparatus according to claim 15, wherein the instructions for receiving include instructions for:
receiving the second data from a data radio bearer (DRB) between the second terminal and the radio access network device.

17. The communications apparatus according to claim 15, wherein the instructions for receiving include instructions for:
receiving the second data from SRB 1.

18. The communications apparatus according to claim 15, wherein the instructions for sending the second RRC message to the second terminal include instructions for:
sending the identifier of the first terminal and the second RRC message to the second terminal through the second path.

* * * * *